(12) United States Patent
Engerman et al.

(10) Patent No.: US 11,415,208 B2
(45) Date of Patent: Aug. 16, 2022

(54) MULTI-SPEED GEARBOX WITH A GEAR-CLUTCH ASSEMBLY

(71) Applicant: Dana Automotive Systems Group, LLC, Maumee, OH (US)

(72) Inventors: Eric M. Engerman, Novi, MI (US); Ryan D. Nelms, Leander, TX (US); Amar Nivarthi, Maumee, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 137 days.

(21) Appl. No.: 16/820,589

(22) Filed: Mar. 16, 2020

(65) Prior Publication Data

US 2020/0292042 A1 Sep. 17, 2020

Related U.S. Application Data

(60) Provisional application No. 62/818,492, filed on Mar. 14, 2019.

(51) Int. Cl.
| | |
|---|---|
| *F16D 25/10* | (2006.01) |
| *F16H 37/08* | (2006.01) |
| *F16H 3/091* | (2006.01) |
| *F16H 61/30* | (2006.01) |
| *F16D 25/06* | (2006.01) |
| *B60K 1/00* | (2006.01) |
| *B60T 1/00* | (2006.01) |

(Continued)

(52) U.S. Cl.
CPC ........... *F16H 37/0813* (2013.01); *B60K 1/00* (2013.01); *B60T 1/005* (2013.01); *F16D 25/06* (2013.01); *F16D 25/10* (2013.01); *F16H 3/091* (2013.01); *F16H 61/30* (2013.01); *B60K 2001/001* (2013.01); *B60Y 2200/92* (2013.01); *F16D 2121/04* (2013.01); *F16D 2127/02* (2013.01); *F16H 2708/20* (2013.01)

(58) Field of Classification Search
CPC ...... F16H 37/0813; F16H 3/091; F16H 61/30; F16H 2708/20; F16H 2003/0818; F16H 2055/178; F16H 2200/0021; F16H 3/089; F16H 2200/0034; F16H 63/3026; F16H 57/023; F16H 57/037; F16H 2057/02034; F16H 2057/02043; F16H 2057/02086; F16H 2057/02095; B60K 1/00; B60K 2001/001; B60K 17/354; B60K 17/356; B60K 17/12; F16D 25/06; F16D 25/10; F16D 2121/04; F16D 2127/02; F16D 25/0638; F16D 63/006; B60Y 2200/92; B60Y 2200/91

See application file for complete search history.

(56) References Cited

U.S. PATENT DOCUMENTS

| | | |
|---|---|---|
| 6,012,560 A | 1/2000 | Kuroda et al. |
| 6,533,090 B2 | 3/2003 | Osborn et al. |
| 6,779,420 B2 | 8/2004 | Peura |

(Continued)

*Primary Examiner* — David J Hlavka
(74) *Attorney, Agent, or Firm* — McCoy Russell LLP

(57) ABSTRACT

An electric drive axle of a vehicle includes an electric motor having an output shaft. A compound idler assembly is connected to the electric motor. The compound idler assembly includes at least one gear-clutch assembly in driving engagement with the output shaft of the electric motor. A differential is connected to the compound idler assembly, and in selective driving engagement with the compound idler assembly.

7 Claims, 18 Drawing Sheets

(51) Int. Cl.
  *F16D 121/04* (2012.01)
  *F16D 127/02* (2012.01)

(56) References Cited

U.S. PATENT DOCUMENTS

| | | |
|---|---|---|
| 6,790,154 B1 | 9/2004 | Kelley, Jr. |
| 7,007,763 B2 | 3/2006 | Ginther et al. |
| 7,111,702 B2 | 9/2006 | Perlick et al. |
| 7,258,187 B2 | 8/2007 | Bowen |
| 7,361,113 B2 | 4/2008 | Puiu et al. |
| 7,584,832 B2 * | 9/2009 | Baasch ................ B60K 23/04 192/48.2 |
| 7,832,537 B2 | 11/2010 | Blessing et al. |
| 8,062,162 B2 | 11/2011 | Zöhrer |
| 8,322,503 B2 | 12/2012 | Combes et al. |
| 8,650,987 B2 | 2/2014 | Sasaki et al. |
| 8,739,905 B1 | 6/2014 | Bennett |
| 8,968,137 B2 * | 3/2015 | Bausch ............ F16H 57/02004 475/150 |
| 8,991,577 B2 | 3/2015 | Hauck |
| 9,003,925 B2 | 4/2015 | Corliss et al. |
| 9,145,124 B2 | 9/2015 | Joeng |
| 9,234,565 B2 | 1/2016 | Zhang et al. |
| 9,303,697 B2 | 4/2016 | Ren et al. |
| 9,346,354 B2 | 5/2016 | Valente |
| 9,657,826 B1 | 5/2017 | Morgan |
| 2016/0017958 A1 | 1/2016 | Wu et al. |
| 2017/0204940 A1 * | 7/2017 | Tseng ................. B60K 17/06 |
| 2017/0204941 A1 * | 7/2017 | Tseng ................. F16D 25/0638 |

* cited by examiner

SECTION C-C

SECTION D-D

SECTION C-C

SECTION A-A

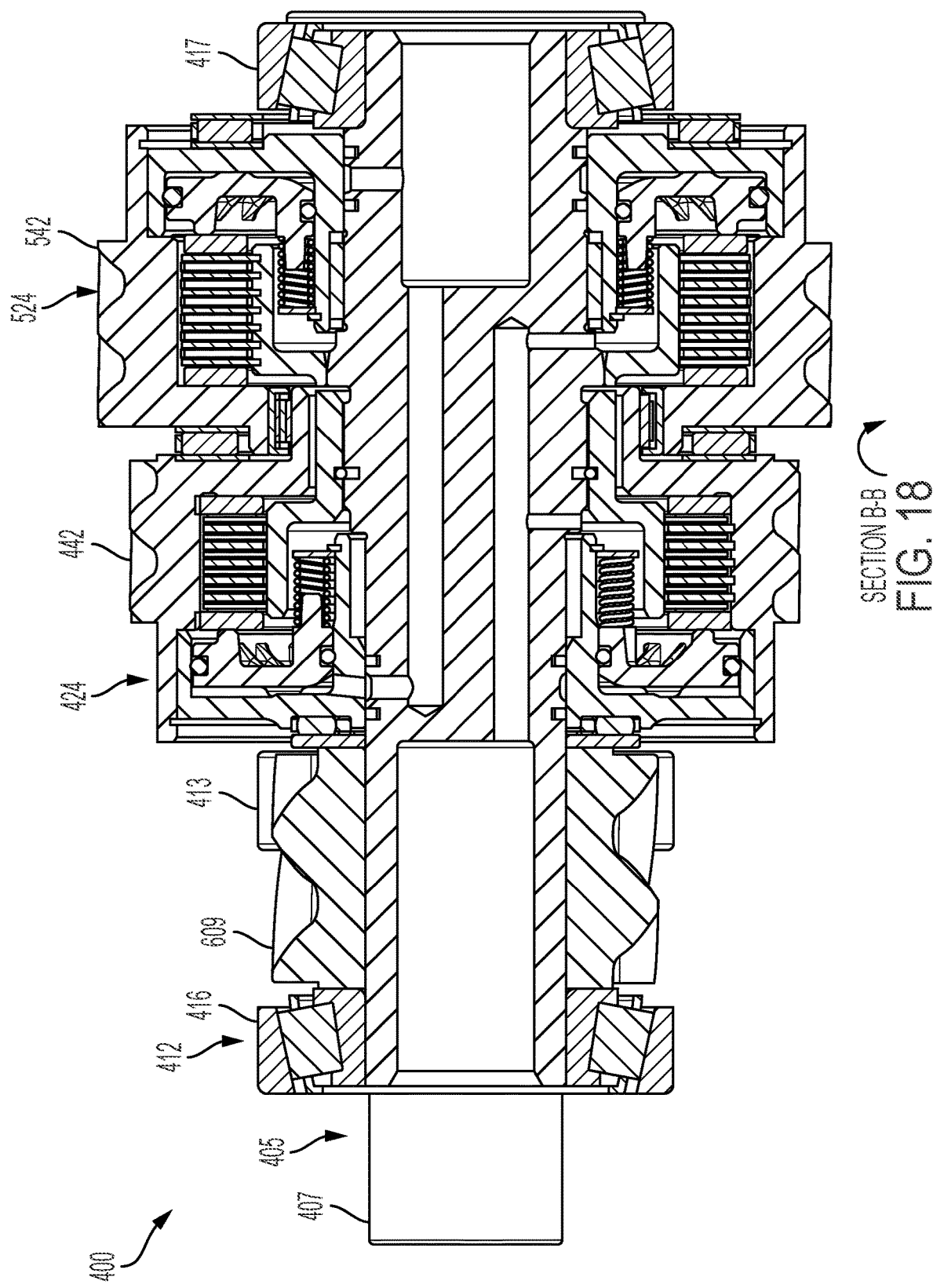

MULTI-SPEED GEARBOX WITH A GEAR-CLUTCH ASSEMBLY

CROSS REFERENCE TO RELATED APPLICATIONS

The present application claims priority to U.S. Provisional Application No. 62/818,492, entitled "Multi-Speed Gearbox with a Gear-Clutch Assembly", and filed on Mar. 14, 2019. The entire contents of the above-listed application are hereby incorporated by reference for all purposes.

TECHNICAL FIELD

The present disclosure relates to electric drive axles, and more particularly to a multi-speed gearbox for an electric drive axle.

BACKGROUND AND SUMMARY

Electric and hybrid-electric vehicles utilize an electric power source in communication with an electric motor to provide drive, or augmented drive, to the vehicle. Electric vehicles have several characteristics superior to conventional internal combustion engine driven vehicles. For example, electric motors produce fewer vibrations than internal combustion engines, and electric motors achieve maximum torque more quickly than internal combustion engines.

However, in order for the conventional electric vehicle to achieve sufficient speed, the electric motor must allow for reasonable power over a broad speed range. An electric motor which can provide reasonable power over a broad speed range is typically large and heavy. It would be desirable to produce an electric drive axle having a gear arrangement, at least one clutch assembly, and differential which generates a plurality of gear ratios, and yet remains compact in size and weight.

In concordance and agreement with the present disclosure, an electric drive axle having a gear arrangement, at least one clutch assembly, and differential which generates a plurality of gear ratios, and yet remains compact in size and weight, has surprisingly been discovered.

The present disclosure provides for an electric drive axle for a vehicle. In one embodiment, the electric drive axle of the vehicle comprises an electric motor having an output shaft. A compound idler assembly is connected to the electric motor. The compound idler assembly includes at least one gear-clutch assembly in driving engagement with the output shaft of the electric motor. A differential is connected to the compound idler assembly, and in selective driving engagement with the compound idler assembly.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

FIG. 18 is a cross-sectional view taken along section line B-B detailed in FIG. 16 of the portion of the electric drive axle shown in FIGS. 11-17.

DETAILED DESCRIPTION

Figure 1:
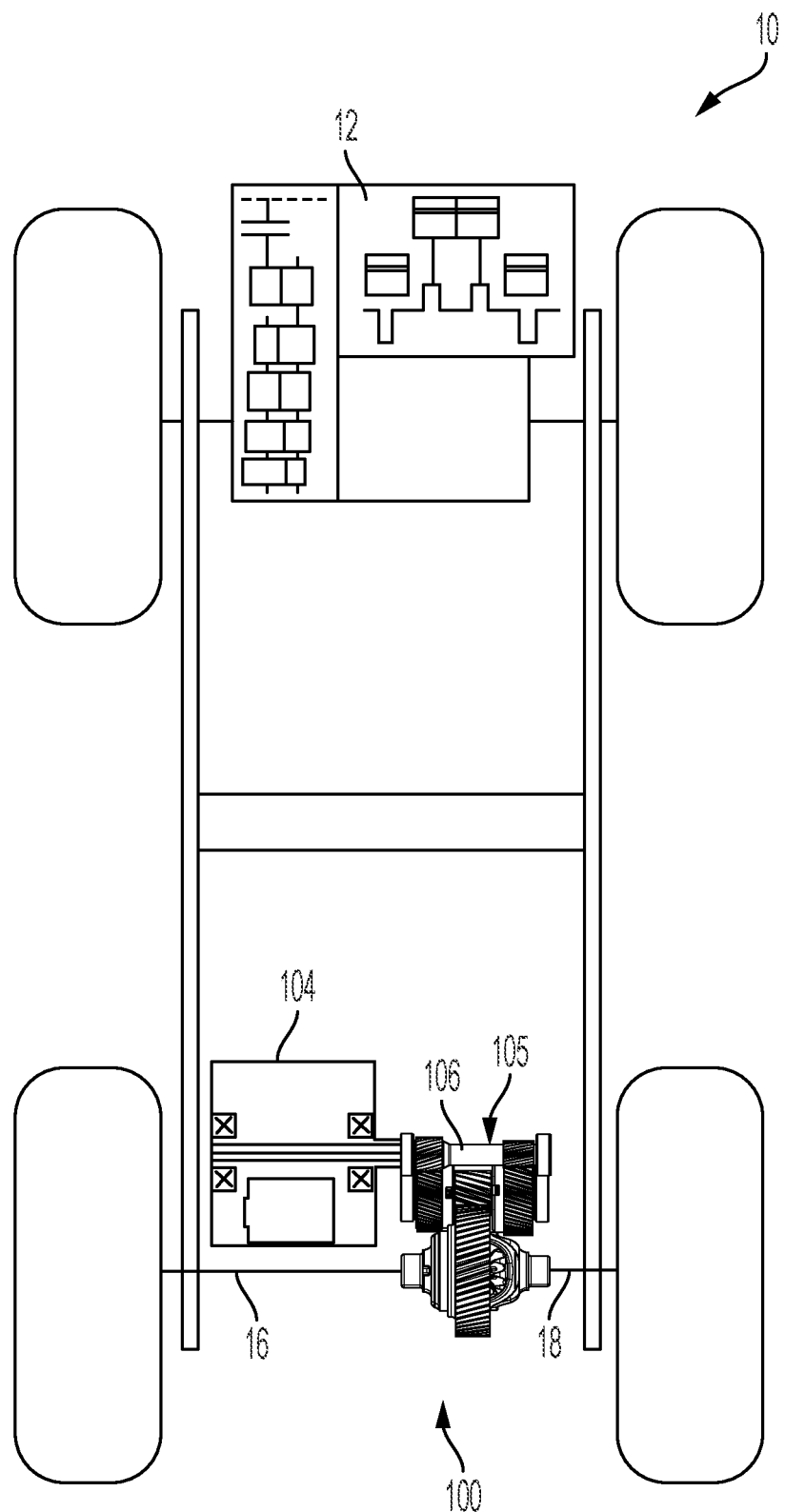
FIG. 1 is a schematic diagram of a vehicle driveline according to an embodiment of the presently disclosed subject matter.

It is to be understood that the invention may assume various alternative orientations and step sequences, except where expressly specified to the contrary.

It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Embodiments of an electric drive axle are described below. In certain embodiments, the electric drive axles 100, 400 are utilized with a pure electric vehicle (not depicted) where the electric drive axles 100, 400 are the only driving axle. In other embodiments, as illustrated in FIG. 1, the electric drive axles 100, 400 are utilized with a hybrid four-wheel-drive vehicle 10 where the front axle is driven by an internal combustion engine 12, and the rear axle is one of the electric drive axles 100, 400 (or vice versa). In still other embodiments, the electric drive axles 100, 400 are utilized in a hybrid commercial vehicle (not depicted) comprising a tandem axle in which the front tandem axle is driven by an internal combustion engine, and the rear tandem axle is one of the electric drive axles 100, 400 (or vice versa). In certain embodiments, each of the electric drive axles 100, 400 includes a first half axle 16 and a second half axle 18, each of which is coupled to a wheel assembly of the vehicle 10. The electric drive axles 100, 400 may have applications in commercial vehicles, both light duty and heavy duty vehicles, and for passenger, off-highway, and sport utility vehicles. Additionally, the electric drive axles 100, 400 described herein may be adapted for use in front and/or rear driving axles, and in steerable and non-steerable axles. It would be understood by one of ordinary skill in the art that the electric drive axles 100, 400 also have industrial, locomotive, military, agricultural, and aerospace applications.

The electric drive axles 100, 400 may also comprise an integrated drive system. As shown in FIG. 1, each of the electric drive axles 100, 400 includes an electric motor 104 (e.g., electromotor) coupled with a power source (not depicted). The electric motor 104 may be a permanent magnet synchronous machine comprising a stator disposed concentrically about a rotor. Each of the electric drive axles 100, 400 may additionally comprise an inverter (not depicted) for converting direct current to alternating current when the electric motor 104 is utilized to drive the vehicle, and for converting alternating current to direct current when the vehicle decelerates. The electric motor 104 may be referred to herein as a motor-generator. Further, the electric drive axles 100, 400 may include cooling fluid (not depicted such as, but not limited to, automatic transmission fluid or axle oil) integrated with the electric drive axle 100, 400 lubricant for cooling the electric motor 104 and the inverter. In another embodiment (not depicted), the cooling fluid for the electric motor 104 and the inverter may not be integrated with the axle oil. The electric drive axle 100, 400 may have either a co-axial or off-axis layout (as shown) where the axle shaft connecting the wheel to the differential does not pass through the center or the motor but rather parallel to the motor axis.

Referring now to FIGS. 2-10, a motor output assembly 105 having a motor output shaft 106 is coupled with the rotor of the electric motor 104 for rotation therewith. A first end 107 of the motor output shaft 106 may include a plurality of splines (not depicted) to facilitate coupling to the electric motor 104. It should be appreciated, however, that the motor output assembly 105 can be coupled to the electric motor 104 by various other coupling methods, if desired. In certain embodiments, the motor output shaft 106 has a generally uniform diameter extending from the first end 107 to an opposite second end 109. Yet, in other embodiments, the motor output shaft 106 may be tapered having a gradually increasing diameter from the first end 107 to the second end 109.

A first gear 108 and a second gear 110 may be coupled with the motor output shaft 106 for rotation therewith. As shown, the first gear 108 is disposed axially adjacent the first end 107 and the second gear 110 is disposed axially adjacent the second end 109. In an embodiment, the first and second gears 108, 110 are forged on the motor output shaft 106. In another embodiment, the first and second gears 108, 110 may be welded to the motor output shaft 106. In still another embodiment, the first and second gears 108, 110 may be splined to the motor output shaft 106. First and second bearings 113, 115, respectively, may also be disposed axially adjacent the first end 107 and the second end 109, respectively, to rotatably support the motor output assembly 106 in a housing (not depicted) such as an axle housing (not shown), for example. Various types of bearings 113, 115 such as a roller bearing, a ball bearing, a tapered bearing, and the like, for example, may be employed.

In certain embodiments, the electric motor 104 drives a compound idler assembly 112 via the motor output shaft 106 and the first and second gears 108, 110. As shown, the motor output assembly 105, the compound idler assembly 112, and axle half shafts 16, 18 are disposed offset and parallel relative to one another. It is understood, however, that the motor output assembly 105, the compound idler assembly 112, and the axle half shafts 16, 18 may be disposed co-axially relative to one another. The compound idler assembly 112 includes an idler shaft 114 rotatably supported in a housing (not depicted) such as an axle housing, for example. As more clearly shown in FIGS. 8-10, the idler shaft 114 has an outer first segment 118, an outer second segment 120, and an intermediate third segment 122 interposed axially between the first and second segments 118, 120. The first and second segments 118, 120 form opposing ends of the idler shaft 114. In certain embodiments, a diameter of the first segment 118 is substantially equivalent to a diameter of the second segment 120. A diameter of the third segment 122 shown is greater than the diameters of the segments 118, 120. It is understood, however, that the diameter of each of the segments 118, 120, 122 may be any diameter as desired. As more clearly shown in FIGS. 8-10, each of the segments 118, 120 may include a cavity 127, 129, respectively, formed therein.

Figure 10:
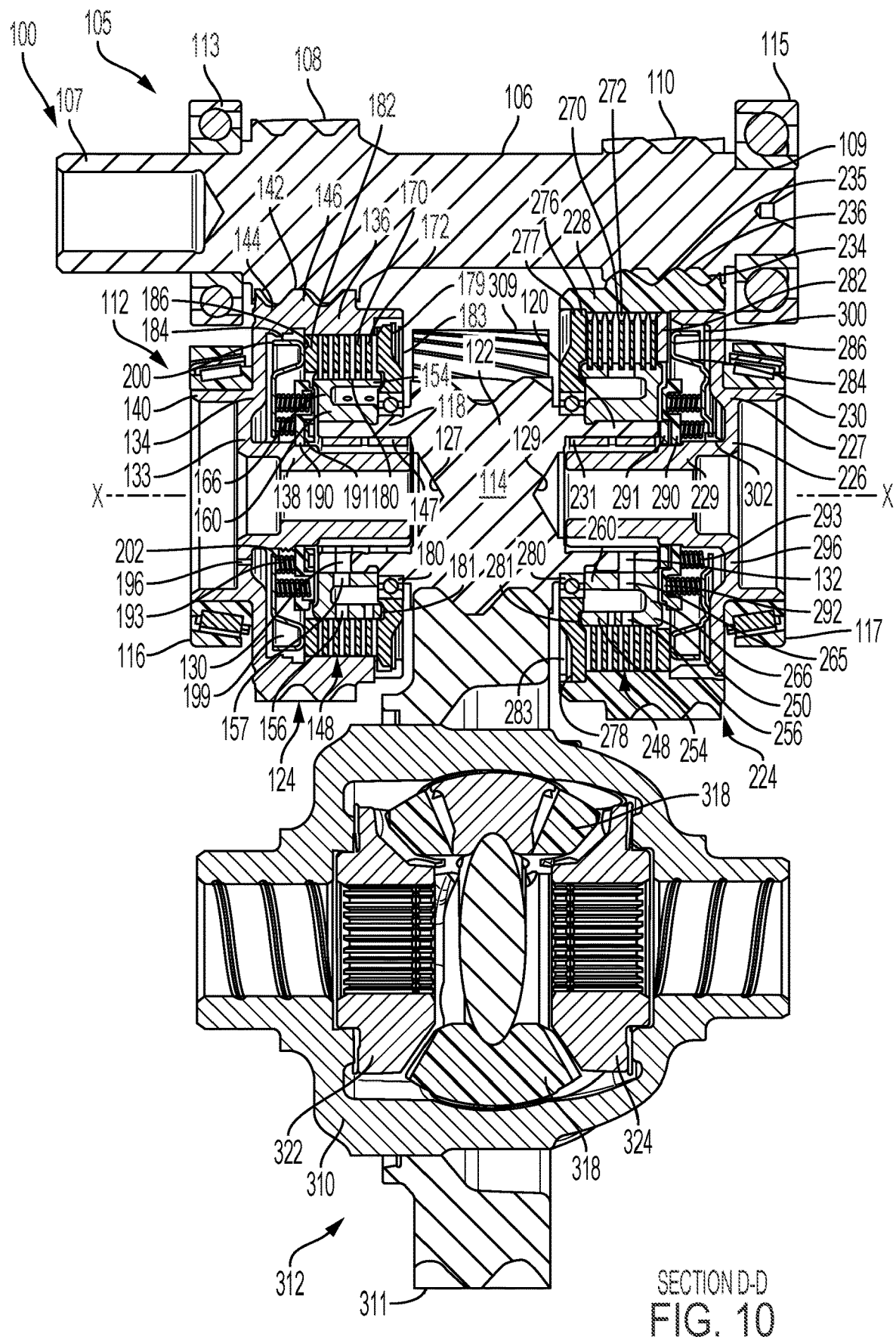
FIG. 10 is a cross-sectional view taken along section line D-D detailed in FIG. 6 of the portion of the electric drive axle shown in FIGS. 2-7.

Each of the segments 118, 120, shown in FIG. 10, may also include first and second fluid passages 130, 132, respectively, formed therein. In one embodiment, the first and second fluid passages 130, 132 are in fluid communication with a first fluid source (not depicted) and configured to receive a first fluid (not depicted) therethrough. Various types of fluid can be used for the first fluid as desired such as a lubricant or cooling fluid, for example. The first and second fluid passages 130, 132 may be formed substantially perpendicular to the longitudinal axis X-X of the idler shaft 114 extending radially outward to an outer peripheral surface of the idler shaft 114. It should be appreciated that any number of the fluid passages 130, 132 may be formed in the idler shaft 114 if desired.

Figure 8:
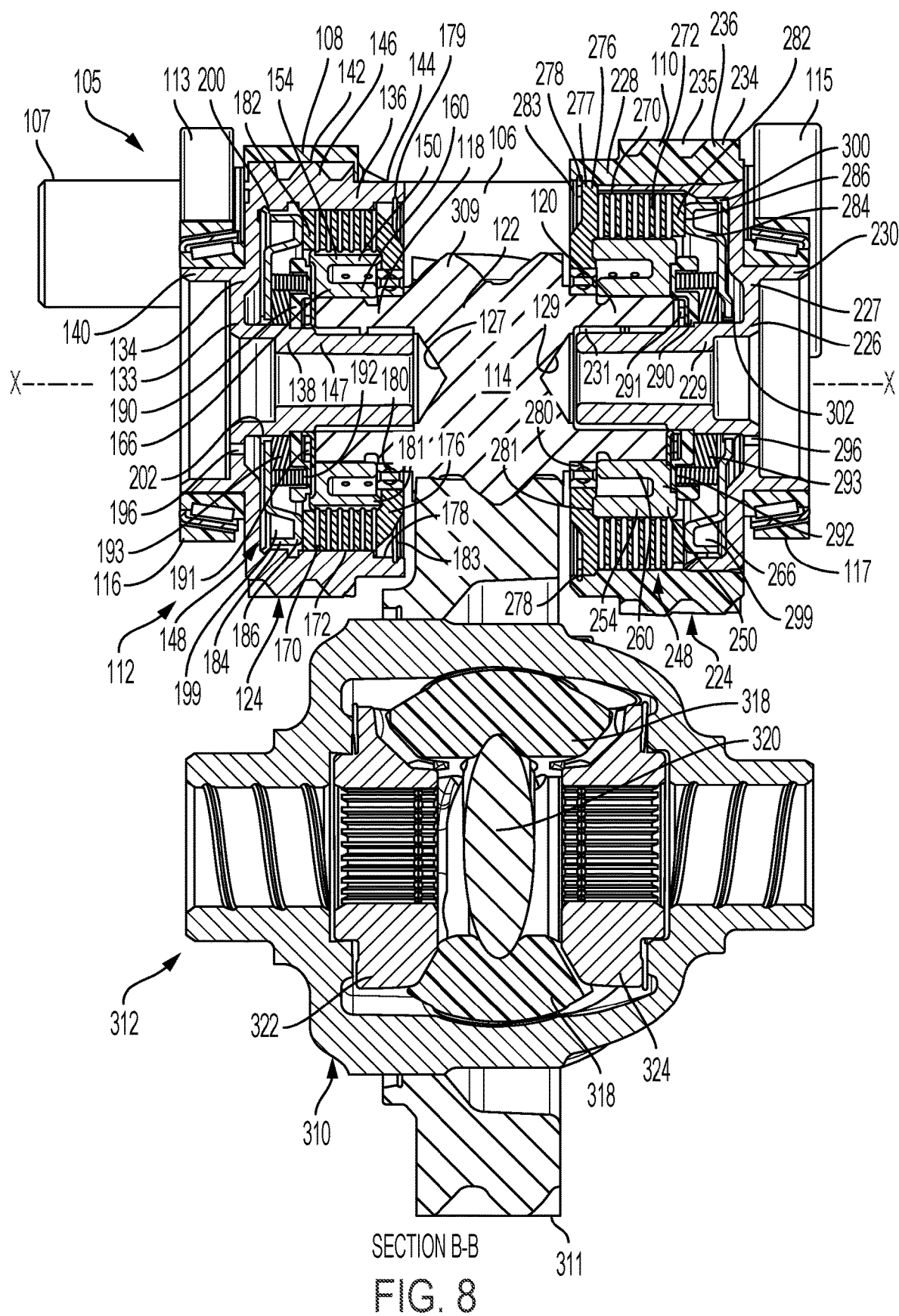
FIG. 8 is a cross-sectional view taken along section line B-B detailed in FIG. 6 of the portion of the electric drive axle shown in FIGS. 2-7.
Figure 9:
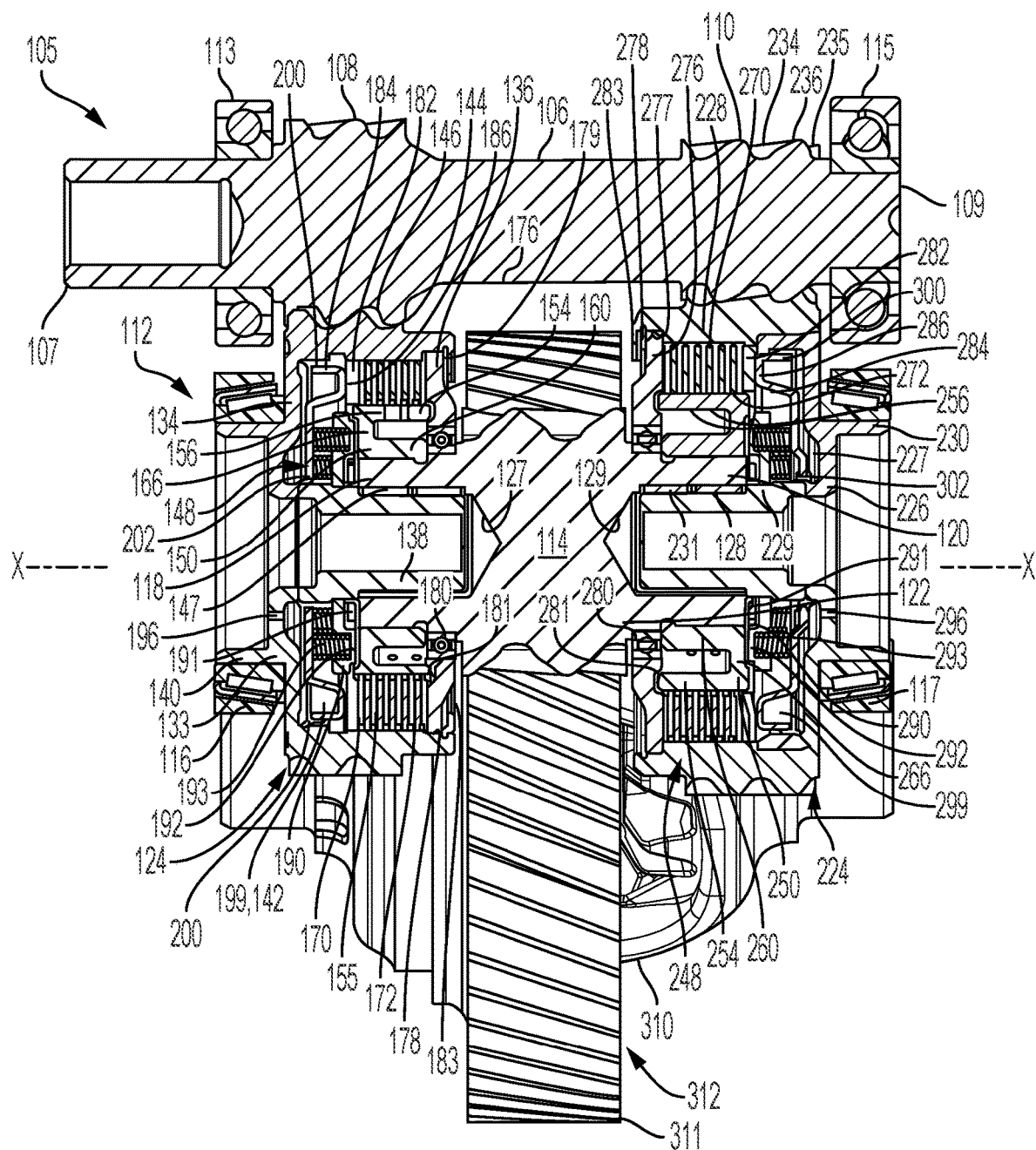
FIG. 9 is a cross-sectional view taken along section line C-C detailed in FIG. 6 of the portion of the electric drive axle shown in FIGS. 2-7.

A first gear-clutch assembly 124 is disposed concentrically about the first segment 118 of the idler shaft 114. The first gear-clutch assembly 124 is in meshed engagement with the first gear 108 of the output shaft 106 of the electric motor 104 and receives torque therefrom. As illustrated in FIGS. 8-10, the first gear-clutch assembly 124 includes a housing 133 having a web portion 134 connecting a radially outer first annular hub 136, a radially inner second annular hub 138, and a third annular hub 140. Both the first and second annular hubs 136, 138 extend axially inward from the web portion 134 and the third annular hub 140 extends axially outward from the web portion 134. A third gear 142 is formed on an outer surface 144 of the first annular hub 136. The third gear 142 is disposed concentrically about at least a portion of the first segment 118 of the idler shaft 114. As illustrated in FIGS. 2-7, the third gear 142 is generally ring-shaped. In an embodiment shown in FIGS. 8-10, the third gear 142 includes a plurality of teeth 146 extending radially outward from the outer surface 144 thereof.

As more clearly shown in FIGS. 8-10, the second annular hub 138 is configured to be received into the cavity 127 formed in the first segment 118 of the idler shaft 114. At least one bearing 147 may be disposed between the second annular hub 138 and an inner surface of the first segment 118. In certain embodiments, a pair of needle bearings 147 is disposed therebetween. A bearing 116 may also be disposed on the third annular hub 140 to rotatably support the compound idler assembly 112 within a housing (not depicted) such as an axle housing, for example. It should be appreciated, however, that any number and type of bearings 116, 147 may be employed as desired.

Referring now to FIGS. 3-10, the first gear-clutch assembly 124 further includes a first clutch 148 therein. The first clutch 148 includes a first clutch drum 150 disposed at least partially concentrically within the first annular hub 136 and the third gear 142. A plurality of splines (not depicted) is formed on an annular flange portion 154 of the first clutch drum 150. The splines extending radially outward from an outer surface of the annular flange portion 154. The annular flange portion 154 may also include at least one aperture 156 formed therethrough. As illustrated in FIG. 10, a pair of apertures 156 is formed at various intervals about a circumference of the annular flange portion 154. It is understood that any number of apertures 156 can be formed at any position in the first clutch drum 150 as desired. Each of the apertures 156 is in fluid communication with the first fluid passage 130 formed in the idler shaft 114 to receive the first fluid therethrough.

The first clutch drum 150 further includes an annular hub 160 formed concentrically within the annular flange portion 154. In certain embodiments, an inner surface of the annular hub 160 includes a plurality of splines (not depicted) formed thereon. The splines of the annular hub 160 are configured to cooperate with the splines formed on the first segment 118 of the idler shaft 114 to couple the annular hub 160 thereto and transfer the torque from the first clutch drum 150 to the idler shaft 114. In other embodiments, the first clutch drum 150 may be coupled to the idler shaft 114 by a press fit. In yet other embodiments, the first clutch drum 150 may be integrally formed with the idler shaft 114 as a unitary component. Accordingly, it should be appreciated that the first clutch drum 150 can be coupled to the idler shaft 114 by any suitable method as desired. The annular hub 160 may also include at least one aperture 157, shown in FIG. 10, formed therethrough. In certain embodiments, a plurality of apertures 157 may be formed at various intervals about a circumference of the annular hub 160. It is understood that any number of apertures 157 can be formed at any position in the first clutch drum 150 as desired. Each of the apertures 157 is in fluid communication with the first fluid passage 130 formed in the idler shaft 114 and the aperture 156 formed in the annular flange portion 154.

A web portion 166 is formed to extend between the annular flange portion 154 of the first clutch drum 150 and the annular hub 160. The web portion 166 may include at least one aperture (not depicted) formed therethrough. In certain embodiments, a plurality of apertures may be formed at various intervals about a circumference of the web portion 166. It is understood that any number of apertures can be formed at any position in the web portion 166 as desired. Each of the apertures may be in fluid communication with at least one of the first fluid passage 130 formed in the idler shaft 114 and the respective apertures 156, 157 formed in the first clutch drum 150. The apertures 156, 157 and the first fluid passage 130 formed in the idler shaft 114 are fluidly connected to facilitate a flow of the first fluid from the first fluid source to the first clutch 148. In certain embodiments, the flow of the first fluid from the fluid source provides at least one of lubrication and cooling to the first clutch 148 of the first gear-clutch assembly 124.

As more clearly shown in FIGS. 8-10, the first clutch 148 includes a plurality of first clutch plates 170 interleaved with a plurality of second clutch plates 172. Each of the clutch plates 170, 172 is concentrically disposed about the first clutch drum 150 and within the first annular hub 136 and the third gear 142. The first clutch plates 170 are in meshed engagement with the first annular hub 136. In certain embodiments, each of the first clutch plates 170 includes a plurality of splines (not depicted) extending radially outward therefrom. The splines of the first clutch plates 170 cooperate with a plurality of splines formed on an inner surface of the first annular hub 136. As such, the first clutch plates 170 receive torque from the first annular hub 136 and the third gear 142. The first clutch plates 170 may move axially relative to the first annular hub 136 and the third gear 142 within the first gear-clutch assembly 124. The first clutch plates 170 transfer the torque from the first annular hub 135 and the third gear 142 to the second clutch plates 172. It is understood that the first clutch plates 170 can be coupled to the first annular hub 136, while permitting an axial movement thereof, by any suitable method as desired.

In one embodiment, the second clutch plates 172 are in meshed engagement with the first clutch drum 150. In certain embodiments, each of the second clutch plates 172 includes a plurality of splines (not depicted) extending radially inward therefrom. The splines of the second clutch plates 172 cooperate with the splines formed on the outer surface of the annular flange portion 154 of the first clutch drum 150. As such, the second clutch plates 172 receive the torque from the first clutch plates 170. The second clutch plates 172 may move axially relative to the first annular hub 136 and the third gear 142 within the first gear-clutch assembly 124. The second clutch plates 172 transfer the torque from the first clutch plates 170 to the first clutch drum 150, and thereby the idler shaft 114. It is understood that the second clutch plates 172 can be coupled to the first clutch drum 150, while permitting an axial movement thereof, by any suitable method as desired.

A first support plate 176 is disposed at a first side of the first clutch 148 within the first annular hub 136 and the third gear 142. The first support plate 176 is generally ring-shaped and concentrically disposed about the idler shaft 114 of the compound idler assembly 112. The first support plate 176 performs as an abutment for the clutch plates 170, 172 during engagement of the first clutch 148. In certain embodiments, the first support plate 176 is configured to be received in an annular recess 178 formed in the inner surface of the first annular hub 136. A positioning element 179 (e.g. a snap ring) may be disposed adjacent the first support plate 176 to maintain a position thereof. In certain embodiments, the positioning element 179 is received in an annular recess formed in the inner surface of the first annular hub 136. At least one thrust element 183 may also be disposed adjacent at least one of the first support plate 176 and the positioning element 179 to provide a friction bearing surface. The first support plate 176 shown also includes an annular recess 181 formed therein. The annular recess 181 is configured to receive at least a portion of the annular flange portion 154 of the first clutch drum 150 therein.

Figure 2:
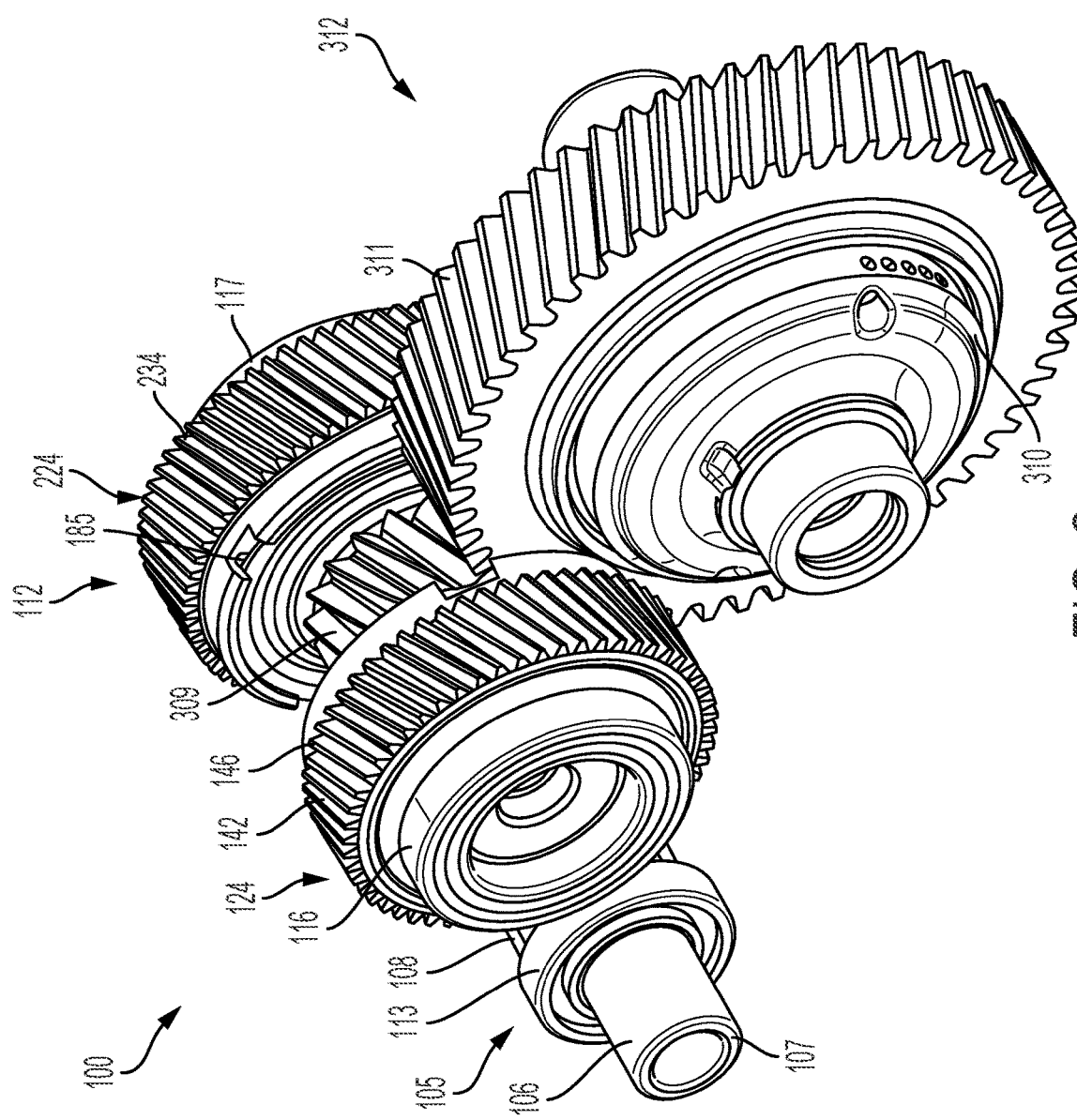
FIG. 2 is a side perspective view of a portion of an electric drive axle of the vehicle driveline shown in FIG. 1 according to one embodiment, including a motor output assembly, a compound idler assembly, and a differential.
Figure 3:
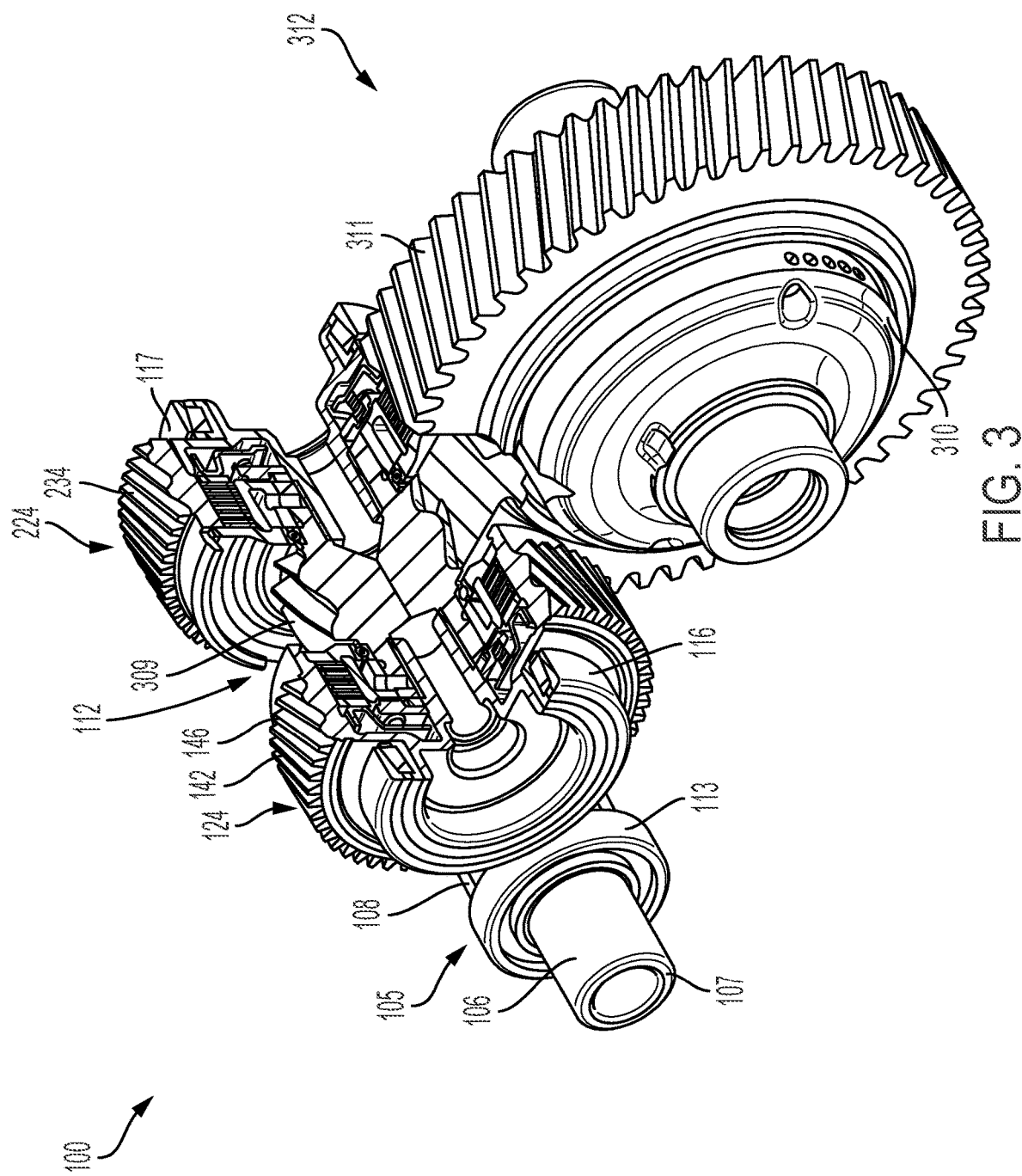
FIG. 3 is a side perspective view of the portion of the electric drive axle shown in FIG. 2, wherein a quarter-section of the compound idler assembly has been removed.
Figure 4:
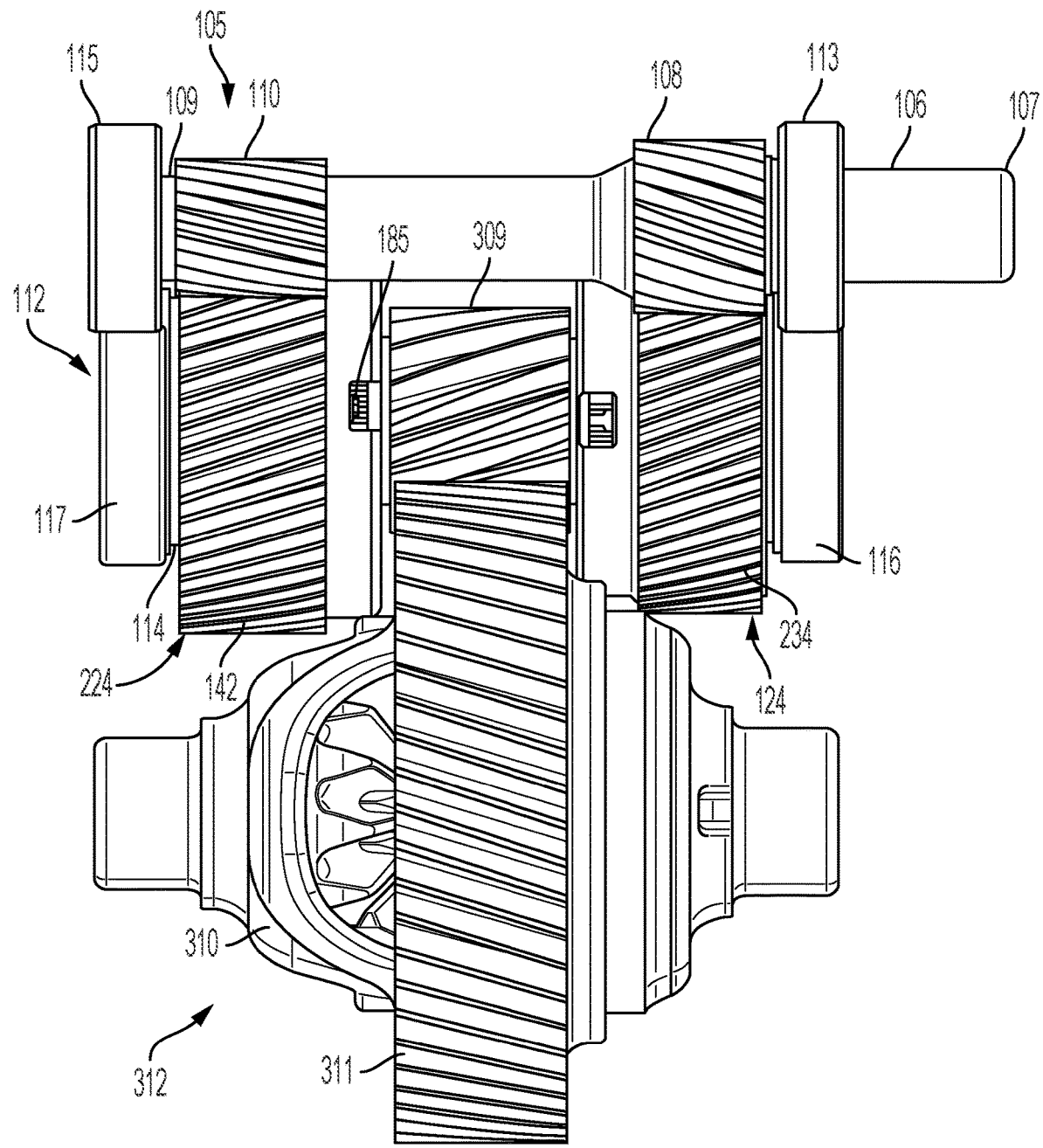
FIG. 4 is a plan view of the portion of the electric drive axle shown in FIGS. 2-3.
Figure 5:
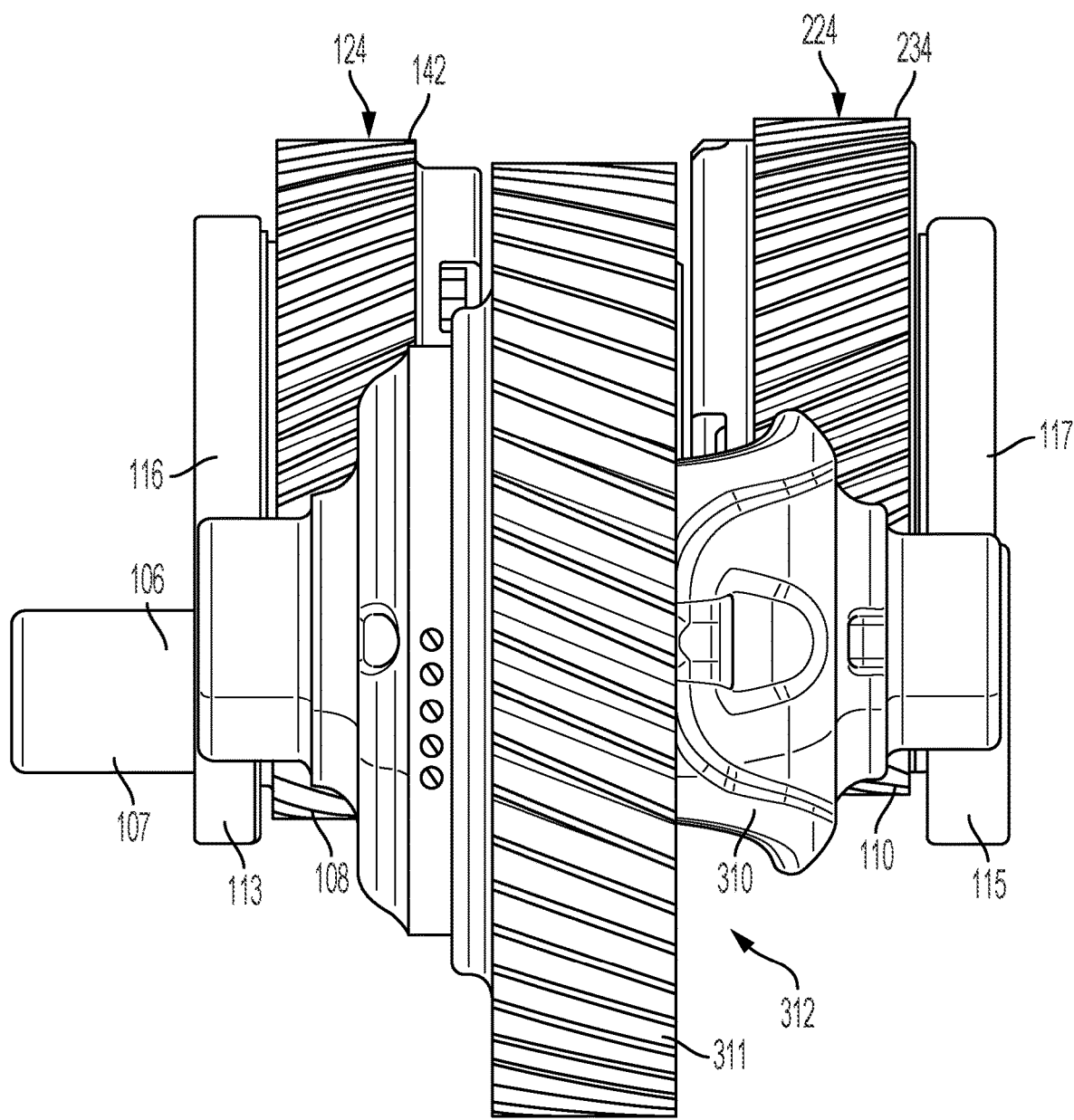
FIG. 5 is a front elevational view of the portion of the electric drive axle shown in FIGS. 2-4.
Figure 6:
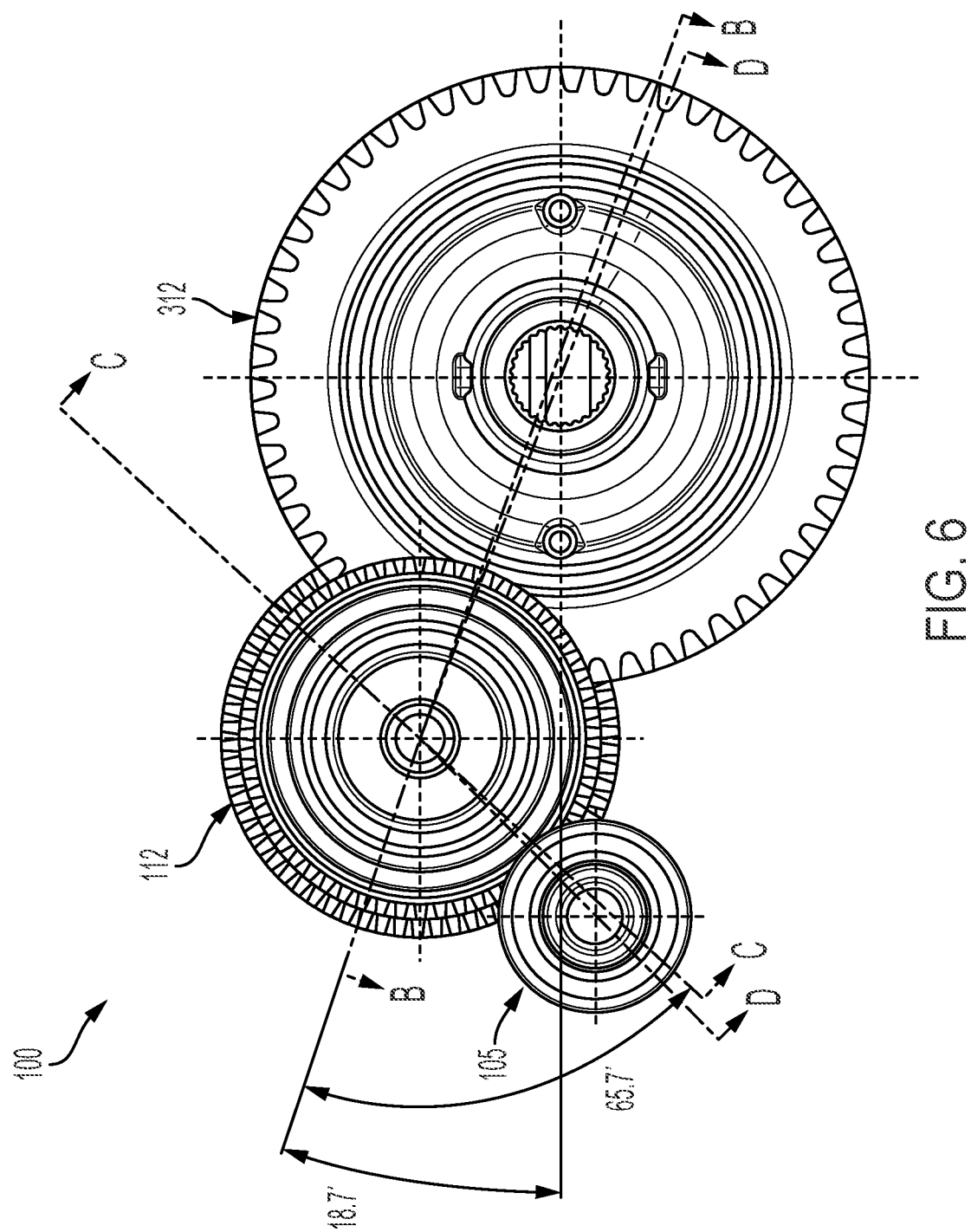
FIG. 6 is a side elevational view of the portion of the electric drive axle shown in FIGS. 2-4.
Figure 7:
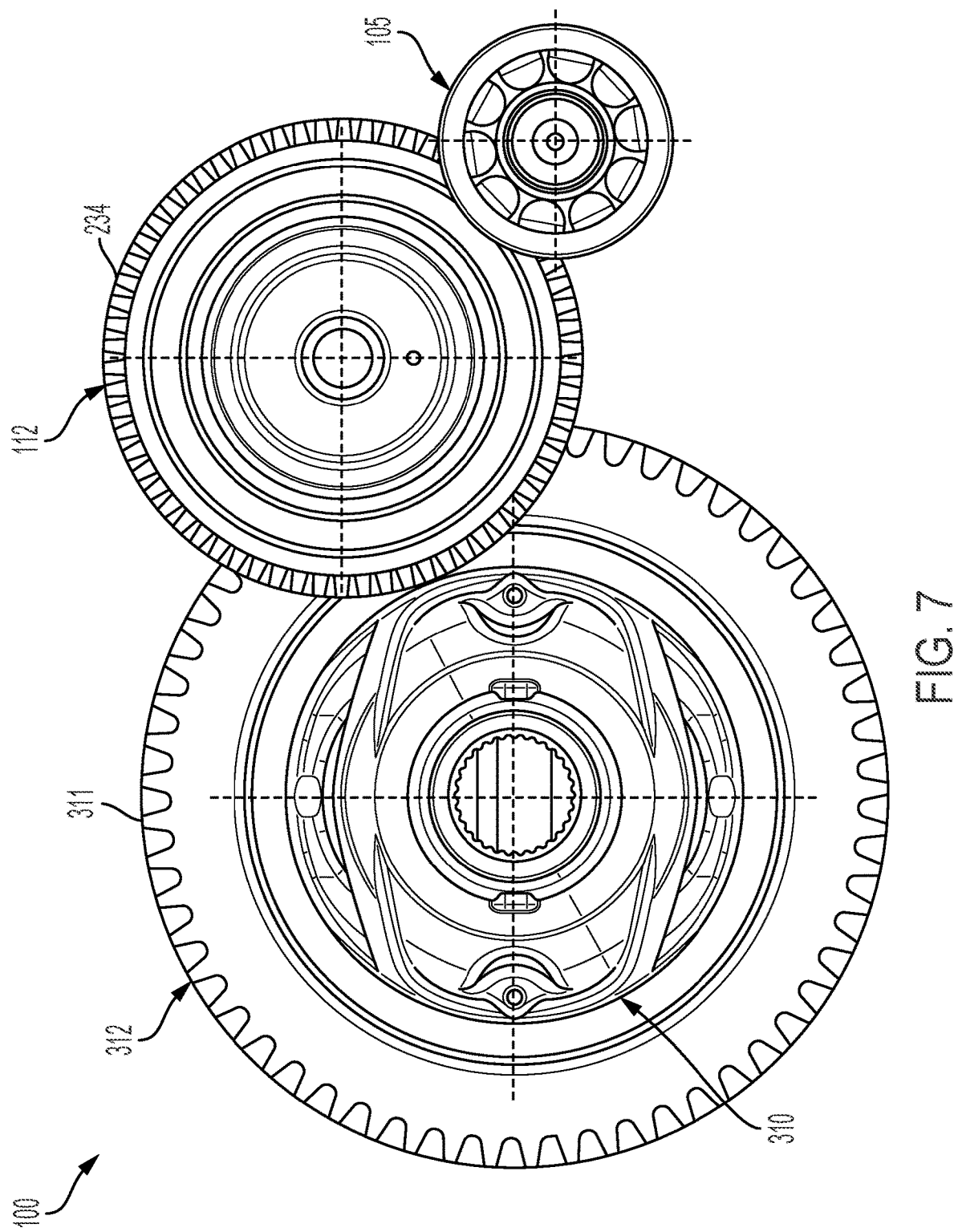
FIG. 7 is a side elevational view of the portion of the electric drive axle shown in FIGS. 2-5.

As illustrated more clearly in FIG. 2, at least one of the first annular hub 136 and the first support plate 176 may also include at least one aperture 185 formed therethrough. The at least one aperture 185 may be formed at various intervals about a circumference of the first annular hub 136 and the first support plate 176. It is understood that any number of apertures 185 can be formed at any position in at least one of the first annular hub 136 and the first support plate 176 as desired. Each of the apertures 185 is in fluid communication with the first clutch 148 to facilitate a flow of the first fluid from the first clutch 148 into the housing (e.g. the axle housing).

In an embodiment shown, a bearing 180 is interposed between the first support plate 176 and the idler shaft 114. Yet, in another embodiment, the bearing 180 is interposed between the first support plate 176 and the annular hub 160 of the first clutch drum 150. The bearing 180 provides rotational support of the first support plate 176. Various types of bearings 180 may be employed as desired. For example, the bearing 180 may be a needle bearing, a roller bearing, or a ball bearing.

As more clearly illustrated FIGS. 8-10, a pressure plate 182 may be disposed at an opposite second side of the first clutch 148 within the first annular hub 136 and the third gear 142. The pressure plate 182 is also generally ring-shaped and concentrically disposed about the idler shaft 114 of the compound idler assembly 112. The pressure plate 182 includes a plurality of splines (not depicted) extending radially outward therefrom. The splines of the pressure plate 182 cooperate with the splines formed on the inner surface of the first annular hub 136. The pressure plate 182 may move axially relative to the first annular hub 136 and the third gear 142 within the first gear-clutch assembly 124. The pressure plate 182 is configured to urge the clutch plates 170, 172 in a first axial direction towards the first support plate 176 during engagement of the first clutch 148. It is understood that the pressure plate 182 can be coupled to the first annular hub 136, while permitting an axial movement thereof, by any suitable method as desired.

As illustrated, a piston member 184 may also be concentrically disposed about the idler shaft 114 axially adjacent to the pressure plate 182. The piston member 184 includes an axially extending annular portion 186. The axially extending annular portion 186 protrudes towards the pressure plate 182 when assembled. The annular portion 186 of the piston member 184 abuts the pressure plate 182 and is configured to urge the pressure plate 182 in the first axial direction towards the first support plate 176 during engagement of the first clutch 148.

In certain embodiments, the first gear-clutch assembly 124 further includes a second support plate 190. The second support plate 190 is concentrically disposed about the second annular hub 138 axially adjacent to the first clutch drum 150. At least one thrust element or bearing 191 may interposed between the second support plate 190 and at least one of the idler shaft 114 and the first clutch drum 150. The at least one thrust element or bearing 191 provides rotational support of the second support plate 190. Various types of thrust elements or bearings 191 may be employed as desired. The thrust element or bearing 191 is configured to militate against frictional contact between the second support plate 190 and the first segment 118 of the idler shaft 114. In certain embodiments, the second support plate 190 may include an annular recess 192 formed therein. A biasing element 193 may be interposed between the piston member 184 and the second support plate 190. A first end of the biasing element 193 is disposed within the annular recess 192 of the second support plate 190. The biasing member 193 is configured to urge the piston member 184 in an opposite second axial direction during an operation of the first clutch 148. The biasing member 193 may be concentrically disposed about the second annular hub 138 and axially between the piston member 184 and the second support plate 190.

In certain embodiments, the web portion 134 may also include a third fluid passage 196 formed therein. The third fluid passage 196 is in fluid communication with a second fluid source (not depicted) and configured to receive a second fluid (not depicted) therethrough. Various types of second fluids from various second fluid sources can be used as desired such as a hydraulic fluid from a hydraulic manifold, for example. As shown, the third fluid passage 196 parallel to the longitudinal axis X-X of the idler shaft 114. It should be appreciated that any number of third fluid passages 196 may be formed in the web portion 134 if desired. A pair of sealing members (not depicted) may be disposed on opposite sides of the third fluid passage 196 to militate against leakage therefrom. In certain embodiments, the sealing members may be disposed in a pair of grooves (not depicted) formed in the web portion 134. It is understood that any number of sealing members may be employed if desired.

As shown, the third fluid passage 196 extends axially inward from an outer surface of the web portion 134 to a chamber 199 formed between the piston member 184 and the web portion 134. In certain embodiments, an amount of the second fluid in the chamber 199 is varied to selectively position the piston member 184 for engagement and disengagement of the first clutch 148. A first sealing member 200 is interposed between the piston member 184 and the inner surface of the first annular hub 136 and a second sealing member 202 is interposed between the piston member 184 and the second annular hub 138 to militate against leakage of the second fluid from the chamber 199 during operation of the first gear-clutch assembly 124. It should be appreciated that the first and second sealing member 200, 202 may be integrally formed as a unitary component if desired.

Similarly, a second gear-clutch assembly 224 is disposed concentrically about the second segment 120 of the idler shaft 114. The second gear-clutch assembly 224 is in meshed engagement with the second gear 110 of the output shaft 106 of the electric motor 104 and receives torque therefrom. As illustrated in FIGS. 8-10, the second gear-clutch assembly 224 includes a housing 226 having a web portion 227 connecting radially outer first annular hub 228, a radially inner second annular hub 229, and a third annular hub 230. Both the first and second annular hubs 227, 228 extend axially inward from the web portion 227 and the third annular hub 230 extends axially outward from the web portion 227. A fourth gear 234 is formed on an outer surface 235 of the first annular hub 228. The fourth gear 234 is disposed concentrically about at least a portion of the second segment 120 of the idler shaft 114. As illustrated in FIGS. 2-7, the fourth gear 234 is generally ring-shaped. In an embodiment shown in FIGS. 8-10, the fourth gear 234 includes a plurality of teeth 236 extending radially outward from the outer surface 235 thereof.

As more clearly shown in FIGS. 8-10, the second annular hub 138 is configured to be received into the cavity 129 formed in the second segment 120 of the idler shaft 114. At least one bearing 231 may be disposed between the second annular hub 229 and an inner surface of the second segment 120. In certain embodiments, a pair of needle bearings 231 is disposed therebetween. A bearing 117 may also be disposed on the third annular hub 230 to rotatably support the compound idler assembly 112 within a housing (not depicted) such as an axle housing, for example. It should be appreciated, however, that any number and type of bearings 117, 231 may be employed as desired.

Referring now to FIGS. 3-10, the second gear-clutch assembly 224 further includes a second clutch 248 therein. The second clutch 248 includes a second clutch drum 250 disposed at least partially concentrically within the first annular hub 228. A plurality of splines (not depicted) is formed on an annular flange portion 254 of the second clutch drum 250 extending radially outward from an outer surface of the annular flange portion 254. The annular flange portion 254 may also include at least one aperture 256 formed therethrough. As illustrated in FIG. 10, a pair of the apertures 256 may be formed at various intervals about a circumference of the annular flange portion 254. It is understood that any number of the apertures 256 may be formed at any position in the second clutch drum 250 as desired. Each of the apertures 256 may be in fluid communication with the second fluid passage 132 formed in the idler shaft 114 to receive the first fluid therethrough.

The second clutch drum 250 further includes an annular hub 260 formed concentrically within the annular flange portion 254. In certain embodiments, an inner surface of the annular hub 260 includes a plurality of splines (not depicted) formed thereon. The splines of the annular hub 260 are configured to cooperate with the splines formed on the second segment 120 of the idler shaft 114 to couple the annular hub 260 thereto and transfer the torque from the second clutch drum 250 to the idler shaft 114. In other embodiments, the second clutch drum 250 may be coupled to the idler shaft 114 by a press fit. In yet other embodiments, the second clutch drum 250 may be integrally formed with the idler shaft 114 as a unitary component. Accordingly, it should be appreciated that the second clutch drum 250 can be coupled to the idler shaft 114 by any suitable method as desired. The annular hub 260 may also include at least one aperture 265, shown in FIG. 10, formed therethrough. In certain embodiments, a plurality of apertures 265 may be formed at various intervals about a circumference of the annular hub 260. It is understood that any number of apertures 265 can be formed at any position in the second clutch drum 250 as desired. Each of the apertures 265 is in fluid communication with the second fluid passage 132 formed in the idler shaft 114 and the aperture 256 formed in the annular flange portion 254.

A web portion 266 is formed to extend between the annular flange portion 254 of the second clutch drum 250 and the annular hub 260. The web portion 266 may include at least one aperture (not depicted) formed therethrough. In certain embodiments, a plurality of the apertures may be formed at various intervals about a circumference of the web portion 266. It is understood that any number of apertures can be formed at any position in the web portion 266 as desired. Each of the apertures may be in fluid communication with at least one of the second fluid passage 132 formed in the idler shaft 114 and the aperture 256 formed in the annular flange portion 254. The apertures 256, 265 and the second fluid passage 132 are fluidly connected to facilitate a flow of the first fluid from the first fluid source to the second clutch 248. In certain embodiments, the flow of the first fluid from the first fluid source provides at least one of lubrication and cooling to the second clutch 248 of the second gear-clutch assembly 224.

As more clearly shown in FIG. 8-10, the second clutch 248 includes a plurality of first clutch plates 270 interleaved with a plurality of second clutch plates 272. Each of the clutch plates 270, 272 is concentrically disposed about the second clutch hub 250 and within the first annular hub 228 and the fourth gear 234. The first clutch plates 270 are in meshed engagement with the first annular hub 228. In certain embodiments, each of the first clutch plates 270 includes a plurality of splines (not depicted) extending radially outward therefrom. The splines of the first clutch plates 270 cooperate with a plurality of splines (not depicted) formed on an inner surface of the first annular hub 228. As such, the first clutch plates 270 receive torque from the first annular hub 228 and the fourth gear 234. The first clutch plates 270 may move axially relative to the first annular hub 228 and the fourth gear 234 within the second gear-clutch assembly 224. The first clutch plates 270 transfer the torque from the first annular hub 228 and the fourth gear 234 to the second clutch plates 272. It is understood that the first clutch plates 270 can be coupled to the first annular hub 228, while permitting an axial movement thereof, by any suitable method as desired.

In an embodiment, the second clutch plates 272 are in meshed engagement with the second clutch hub 250. In certain embodiments, each of the second clutch plates 272 includes a plurality of splines (not depicted) extending radially inward therefrom. The splines of the second clutch plates 272 cooperate with the splines formed on the outer surface of the annular flange portion 254 of the second clutch drum 250. As such, the second clutch plates 272 receive the torque from the first clutch plates 270. The second clutch plates 272 may move axially relative to the first annular hub 228 and the fourth gear 234 within the second gear-clutch assembly 224. The second clutch plates 272 transfer the torque from the first clutch plates 270 to the second clutch drum 250, and thereby the idler shaft 114. It is understood that the second clutch plates 272 can be coupled to the second clutch drum 250, while permitting an axial movement thereof, by any suitable method as desired.

A first support plate 276 is disposed at a first side of the second clutch 248 within the first annular hub 228 and the fourth gear 234. The first support plate 276 is generally ring-shaped and concentrically disposed about the idler shaft 114 of the compound idler assembly 112. The first support plate 276 performs as an abutment for the clutch plates 270, 272 during engagement of the second clutch 248. In certain embodiments, the first support plate 276 is configured to be received in an annular recess 277 formed in the inner surface of the first annular hub 228. A positioning element 278 (e.g. a snap ring) may be disposed adjacent the first support plate 276 to maintain a position thereof. In certain embodiments, the positioning element 278 is received in an annular recess formed in the inner surface of the first annular hub 228. At least one thrust element 283 may also be disposed adjacent at least one of the first support plate 276 and the positioning element 278 to provide a friction bearing surface. The first support plate 276 shown also includes an annular recess 281 formed therein. The annular recess 281 is configured to receive at least a portion of the annular flange portion 254 of the second clutch drum 250 therein.

As illustrated more clearly in FIG. 2, at least one of the first annular hub 228 and the first support plate 276 may also include at least one aperture 185 formed therethrough. The at least one aperture 285 may be formed at various intervals about a circumference of the first annular hub 228 and the first support plate 276. It is understood that any number of apertures 285 can be formed at any position in at least one of the first annular hub 228 and the first support plate 276 as desired. Each of the apertures 285 is in fluid communication with the second clutch 248 to facilitate a flow of the first fluid from the second clutch 248 into the housing (e.g. the axle housing).

In an embodiment shown, a bearing 280 is interposed between the first support plate 276 and the idler shaft 114. Yet, in another embodiment, the bearing 280 is interposed between the first support plate 276 and the annular hub 260 of the first clutch drum 250. The bearing 280 provides rotational support of the first support plate 276. Various types of bearing 280 may be employed as desired. For example, the bearing 280 may be a needle bearing, a roller bearing, or a ball bearing.

As more clearly illustrated FIGS. 8-10, a pressure plate 282 may be disposed at an opposite second side of the second clutch 248 within the first annular hub 228 and the fourth gear 234. The pressure plate 282 is also generally ring-shaped and concentrically disposed about the idler shaft 114 of the compound idler assembly 112. The pressure plate 282 includes a plurality of splines (not depicted) extending radially outward therefrom. The splines of the pressure plate 282 cooperate with the splines formed on the inner surface of the first annular hub 228. The pressure plate 282 may move axially relative to the first annular hub 228 and the fourth gear 234 within the second gear-clutch assembly 224. The pressure plate 282 is configured to urge the clutch plates 270, 272 in the second axial direction towards the first support plate 276 during engagement of the second clutch 248. It is understood that the pressure plate 282 can be coupled to the first annular hub 228, while permitting an axial movement thereof, by any suitable method as desired.

As illustrated, a piston member 284 may also be concentrically disposed about the idler shaft 114 axially adjacent to the pressure plate 282. The piston member 284 includes an axially extending annular portion 286. The axially extending annular portion 286 protrudes towards the pressure plate 282 when assembled. The annular portion 286 of the piston member 284 abuts the pressure plate 282 and is configured to urge the pressure plate 282 in the second axial direction towards the first support plate 276 during engagement of the second clutch 248.

In certain embodiments, the second gear-clutch assembly 224 further includes a second support plate 290. The second support plate 290 is concentrically disposed about the second annular hub 229 axially adjacent to the second clutch drum 250. At least one thrust element or bearing 291 may interposed between the second support plate 290 and at least one of the idler shaft 114 and the second clutch drum 250. The at least one thrust element or bearing 291 provides rotational support of the second support plate 290. Various types of thrust element or bearings 291 may be employed as desired. The thrust element or bearing 291 is configured to militate against frictional contact between the second support plate 290 and the second segment 120 of the idler shaft 114. In certain embodiments, the second support plate 290 may include an annular recess 292 formed therein. A biasing element 293 may be interposed between the piston member 284 and the second support plate 290. A first end of the biasing element 293 is disposed within the annular recess 292 of the second support plate 290. The biasing member 293 is configured to urge the piston member 284 in an opposite second axial direction during an operation of the second clutch 248. The biasing member 293 may be concentrically disposed about the second annular hub 229 and axially between the piston member 284 and the second support plate 290.

In certain embodiments, the web portion 227 may also include a fourth fluid passage 296 formed therein. The fourth fluid passage 296 is in fluid communication with a third fluid source (not depicted) and configured to receive a third fluid (not depicted) therethrough. Various types of third fluids from various third fluid sources can be used as desired such as a hydraulic fluid from a hydraulic manifold, for example. Similar to the third fluid passage 196 of the first gear-clutch assembly 14, the fourth fluid passage 296 may be formed parallel to the longitudinal axis X-X of the idler shaft 114. It should be appreciated that any number of fourth fluid passages 296 may be formed in the web portion 227 if desired. A pair of sealing members (not depicted) may be disposed on opposite sides of the fourth fluid passage 296 to militate against leakage therefrom. In certain embodiments, the sealing members may be disposed in a pair of grooves (not depicted) formed in the web portion 227. It is understood that any number of sealing members may be employed if desired.

As shown, the fourth fluid passage 296 extends axially inward from an outer surface of the web portion 227 to a chamber 299 formed between the piston member 284 and the web portion 227. In certain embodiments, an amount of the third fluid in the chamber 299 is varied to selectively position the piston member 284 for engagement and disengagement of the second clutch 248. A first sealing member 300 is interposed between the piston member 284 and the inner surface of the first annular hub 136 and a second sealing member 302 is interposed between the piston member 284 and the second annular hub 229 to militate against leakage of the third fluid from the chamber 299 during operation of the second gear-clutch assembly 224.

As illustrated in FIGS. 2-10, a fifth gear 309 is disposed concentrically about and coupled with the third segment 122 of the idler shaft 114. In an embodiment, the fifth gear 309 may be forged on the idler shaft 114. The fifth gear 309 is in meshed engagement with a sixth gear 311. As illustrated in FIG. 2-10, the sixth gear 311 is coupled to, and fixed for rotation with, a differential case 310 of a differential 312. The differential case 310 is rotatably supported within a housing (not depicted) such as the axle housing, via a pair of bearings (not depicted). It should be appreciated that any type of bearing can be employed such as a needle bearing, a roller bearing, a tapered bearing, and the like, for example.

As shown in FIGS. 8 and 10, the differential 312 further includes two or more differential pinions 318. The differential pinions 318 are coupled within the differential case 310 via a pinion shaft 320 (i.e., spider shaft). In an embodiment, the pinion shaft 320 may comprise a cross member. The differential pinions 318 are in meshed engagement with a first side gear 322 and a second side gear 324. The first side gear 322 is coupled for rotation with the first axle shaft 16, and the second side gear 324 is coupled for rotation with the second axle shaft 18.

Additionally, the electric drive axle 100 may comprise a fluid actuator assembly (not depicted) such as a hydraulic actuator assembly, for example. The fluid actuator assembly can be in fluid communication with the second and third fluid sources and at least one of the first and second gear-clutch assemblies 124, 224. The fluid actuator assembly utilizes pressurized second and third fluid to actuate the first and second piston members 184, 284 and thereby engage the first and second gear-clutch assemblies 124, 224, respectively.

Referring now to FIGS. 11-18, an electric drive axle 400 according to another embodiment of the present disclosure is shown. The electric drive axle 400 includes a motor output assembly 405 having a motor output shaft 406 is coupled with the rotor of the electric motor 104 for rotation therewith. A first end 407 of the motor output shaft 406 may include a plurality of splines (not depicted) to facilitate coupling to the electric motor 104. It should be appreciated, however, that the motor output assembly 405 can be coupled to the electric motor 104 by various other coupling methods, if desired. The motor output shaft 406 has a first end portion formed adjacent the first end 407, a second end portion formed adjacent an opposite second end 409, and an intermediate portion formed between the end portions and the first and second ends 407, 409. In the embodiment shown, a diameter of the intermediate portion has a larger diameter than a diameter of each of the end portions of the motor output shaft 406. In certain other embodiments, the motor output shaft 406 has a generally uniform diameter extending from the first end 407 to the second end 409. Yet, in another embodiment, the motor output shaft 406 may be tapered having a gradually increasing diameter from the first end 407 to the second end 409.

A first gear 408 and a second gear 410 may be coupled with the motor output shaft 406 for rotation therewith. As shown, the first gear 408 is disposed axially adjacent the second gear 410. The first and second gears 408, 410 are disposed intermediate the first and second ends 407, 409, respectively, of the motor output shaft 406. In an embodiment, the first and second gears 408, 410 are forged on the motor output shaft 406. In another embodiment, the first and second gears 408, 410 may be welded to the motor output shaft 406. In still another embodiment, the first and second gears 408, 410 may be splined to the motor output shaft 406. First and second bearings 413, 415, respectively, may also be disposed axially adjacent the first end 407 and the second end 409, respectively, to rotatably support the motor output assembly 406 in a housing (not depicted) such as an axle housing (not shown), for example. Various types of bearings 413, 415 such as a roller bearing, a ball bearing, a tapered bearing, and the like, for example, may be employed.

The electric drive axle 400 further includes a compound idler assembly 412, which is driven by the electric motor 104 via the motor output shaft 406 and the first and second gears 408, 410. As shown, the motor output assembly 405, the compound idler assembly 412, and a differential 612 configured to receive the axle half shafts 16, 18 are disposed offset and parallel relative to one another. It is understood, however, that the motor output assembly 405, the compound idler assembly 412, and the differential 312 for receiving the axle half shafts 16, 18 may be disposed co-axially relative to one another.

The compound idler assembly 412 includes an idler shaft 414 rotatably supported in a housing (not depicted) such as an axle housing, for example. As more clearly shown in FIG. 12, the idler shaft 414 has an outer first segment 418, an outer second segment 420, and an intermediate third segment 422 interposed axially between the first and second segments 418, 420. The first and second segments 418, 420 form opposing ends of the idler shaft 414. In certain embodiments, a diameter of the first segment 418 is substantially equivalent to a diameter of the second segment 420. A diameter of the third segment 422 shown is greater than the diameters of the segments 418, 420. It is understood, however, that the diameter of each of the segments 418, 420, 422 may be any diameter as desired. Each of the segments 418, 420 may include a cavity 427, 429, respectively, formed therein.

In certain embodiments, a pair of bearings 416, 417 may also be disposed on the first and second segments 418, 420, respectively, of the idler shaft 414 to rotatably support the compound idler assembly 412 within a housing (not depicted) such as an axle housing, for example. It should be appreciated, however, that any number and type of bearings 416, 417 may be employed as desired.

A clutch member 428 is concentrically disposed about the idler shaft 414. In certain embodiments, the clutch member 428 includes a first hub portion 440, an opposite second hub portion 441, and an intermediate portion 439 formed therebetween. As shown, the clutch member 428 is fixedly coupled to the idler shaft 414. In one embodiment, the clutch member 428 is coupled to the idler shaft 414 by a splined engagement therebetween. In another embodiment, the clutch member 428 is fixedly coupled to the idler shaft 414 by other methods such as by a weld or a press fit, for example. In yet other embodiments, the clutch member 428 may be integrally formed with the idler shaft 414 as a unitary component. Accordingly, it should be appreciated that the clutch member 428 can be coupled to the idler shaft 414 by any suitable method as desired. A sealing member 447 may be disposed in an annular groove 445 formed in at least one of the clutch member 428 and the idler shaft 414. The sealing member 447 forms a substantially fluid-tight seal between the clutch member 428 and idler shaft 414.

The first and second segments 418, 420 may also include first and second fluid passages 430, 432, respectively, formed therein. It should be appreciated that any number of the fluid passages 430, 432 may be formed in the idler shaft 414 if desired.

In certain embodiments, the first fluid passage 430 includes at least one first fluid conduit 430A formed parallel to the longitudinal axis X-X of the idler shaft 414 and extending axially from the cavity 427 through the idler shaft 414 to an intermediation portion thereof. The first fluid passage 430 shown further includes at least one second fluid conduit 435B formed perpendicular to the longitudinal axis X-X of the idler shaft 414 and extending radially from the at least one first fluid conduit 435A to an outer peripheral surface of the idler shaft 414. In one embodiment, the first fluid passage 430 is in fluid communication with a first fluid source (not depicted) and configured to receive a first fluid (not depicted) therethrough. Various types of fluid can be used for the first fluid as desired such as a lubricant or cooling fluid, for example. The first fluid passage 430, and more particularly the fluid conduits 430A, 430B, permit a flow of the first fluid from the first fluid source to within a first gear-clutch assembly 424 and a second gear-clutch assembly 524 to provide at least one of lubrication and cooling thereto. It should be appreciated that the first fluid passage 430 may be formed from any number, size, and shape of fluid conduits 430A, 430B as desired.

In certain embodiments, the first gear-clutch assembly 424 and the second gear-clutch assembly 524 each include a housing 433, 533, respectively, which may also include at least one aperture (not depicted) formed therethrough. The at least one aperture may be formed at various intervals through the housing 433 of the first gear-clutch assembly 424 and the housing 533 of the second gear-clutch assembly 524. It is understood that any number of apertures can be formed at any position in the housings 433, 533 as desired. The apertures are in fluid communication with the respective gear-clutch assemblies 424, 524 to facilitate a flow of the first fluid from within the first gear-clutch assembly 424 and the second gear-clutch assembly 524 into the housing (e.g. the axle housing).

As illustrated, the second fluid passage 432 includes at least one first fluid conduit 432A formed parallel to the longitudinal axis X-X of the idler shaft 414 and extending axially from the cavity 429 through the idler shaft 414 to an intermediation portion thereof. The second fluid passage 432 shown further includes at least one second fluid conduit 432B formed perpendicular to the longitudinal axis X-X of the idler shaft 414 and extending radially from either the cavity 429 or the at least one first fluid conduit 432A to an outer peripheral surface of the idler shaft 414. In one embodiment, the second fluid passage 432 is in fluid communication with a second fluid source (not depicted) and configured to receive a second fluid (not depicted) therethrough. Various types of fluid can be used for the second fluid as desired such as a fluid from another vehicle component, for example. In one example, the second fluid is a hydraulic fluid from a hydraulic system of the vehicle. In another example, the second fluid is a cooling fluid from the engine motor 104. The second fluid passage 432, and more particularly the fluid conduits 432A, 432B, permit a flow of the second fluid from the second fluid source to within the first gear-clutch assembly 424 and the second gear-clutch assembly 524 to provide actuation thereof. It should be appreciated that the second fluid passage 432 may be formed from any number, size, and shape of fluid conduits 432A, 432B as desired.

Figure 12:
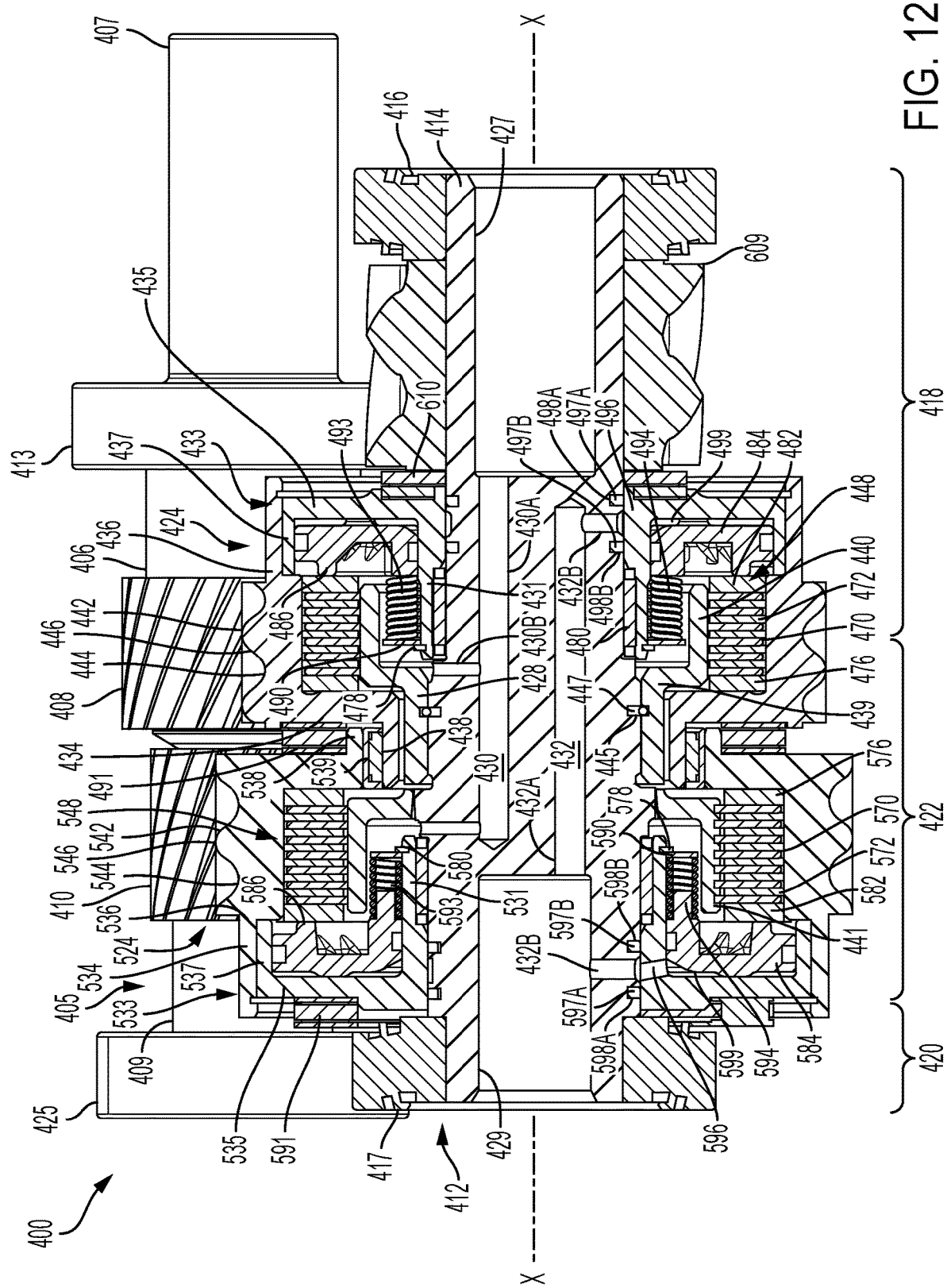
FIG. 12 is a front elevational view of the portion of the electric drive axle shown in FIG. 11, wherein the compound idler assembly is shown in section and the differential has been removed.
Figure 13:
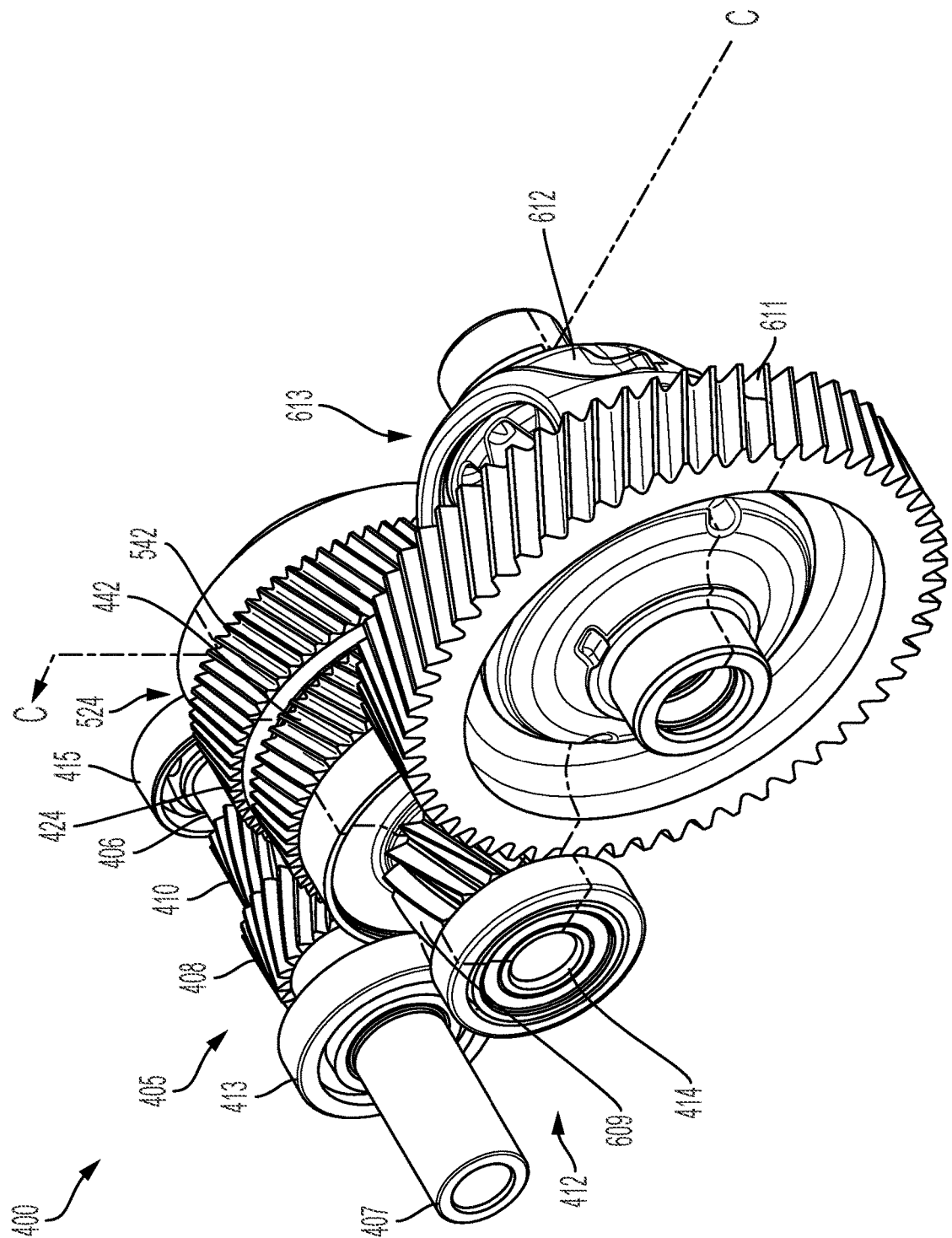
FIG. 13 is an opposite side perspective view of the portion of the electric drive axle of the vehicle driveline shown in FIGS. 11-12.
Figure 14:
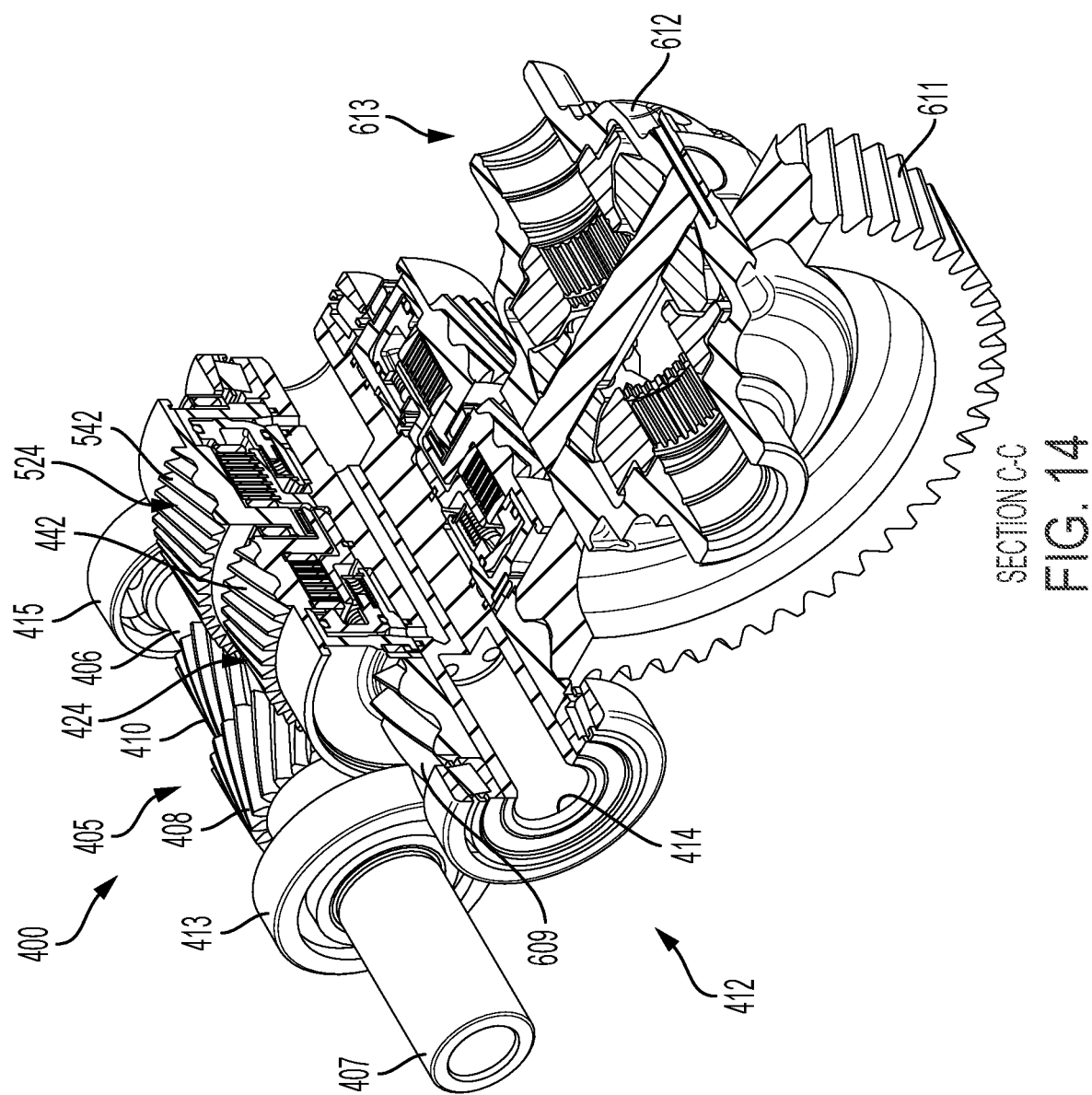
FIG. 14 is a side perspective view of the portion of the electric drive axle shown in FIG. 13, wherein a quarter-section of the compound idler assembly and a half-section of the differential has been removed.
Figure 15:
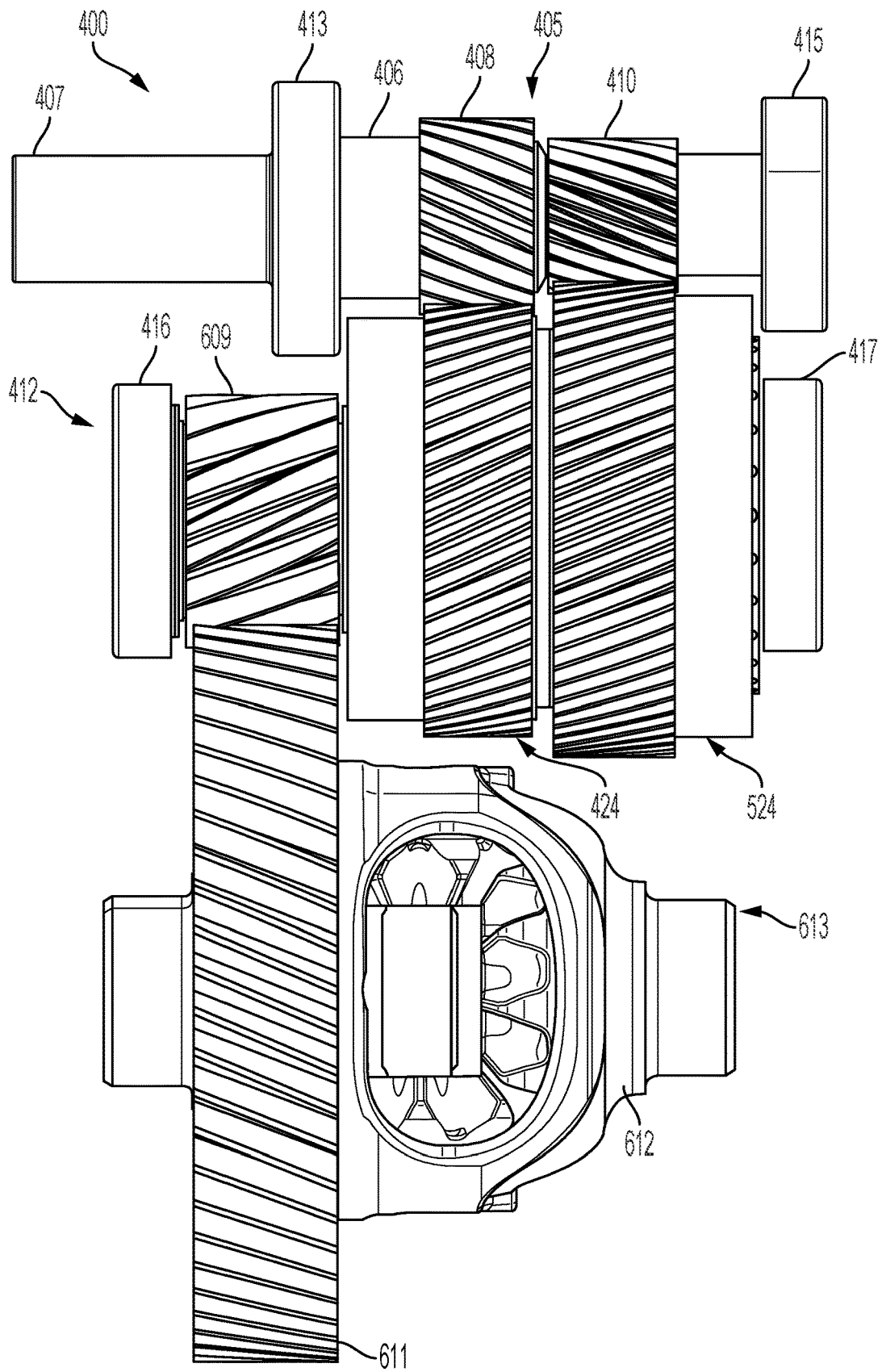
FIG. 15 is a plan view of the portion of the electric drive axle shown in FIGS. 11-14.
Figure 16:
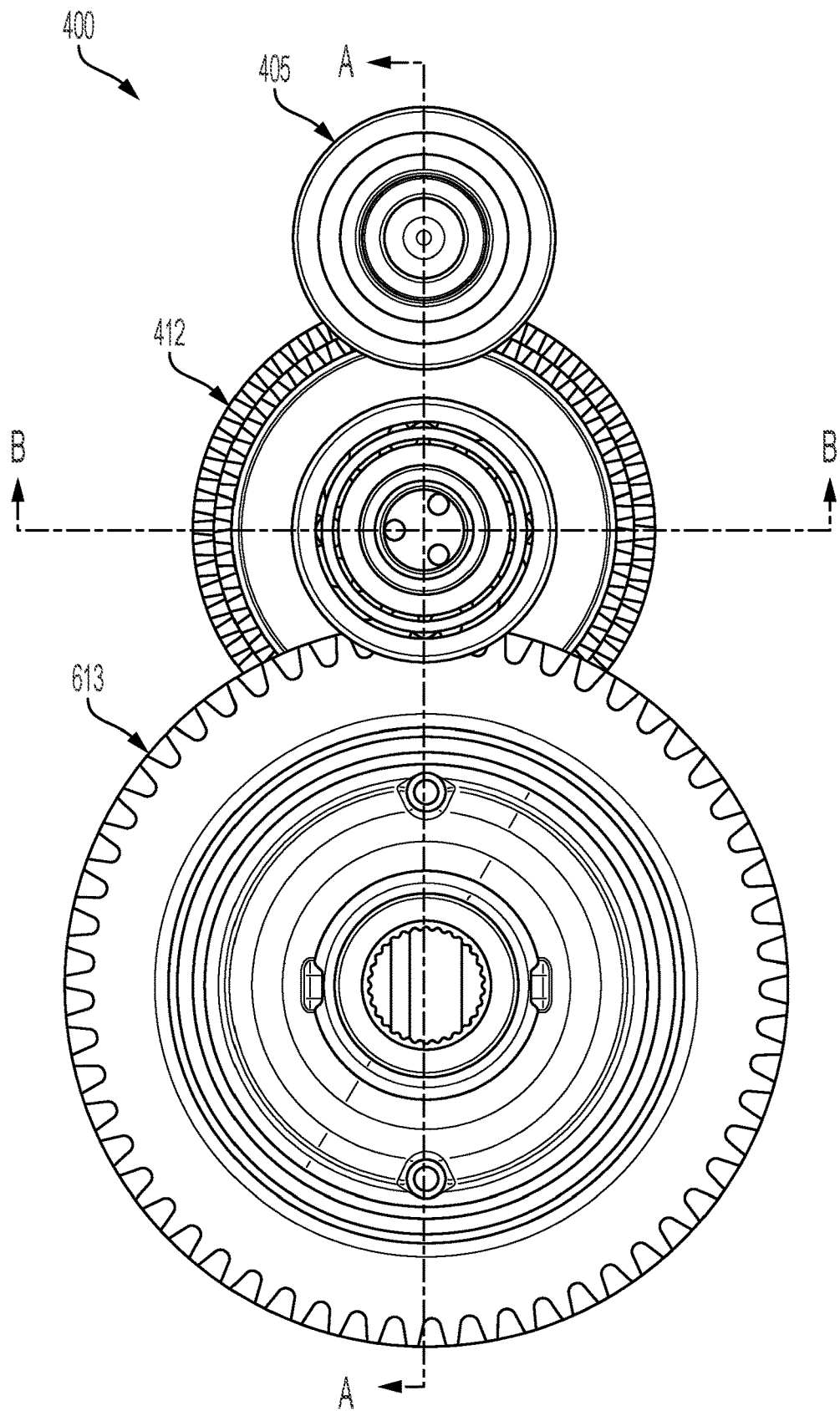
FIG. 16 is a side elevational view of the portion of the electric drive axle shown in FIGS. 11-15.
Figure 17:
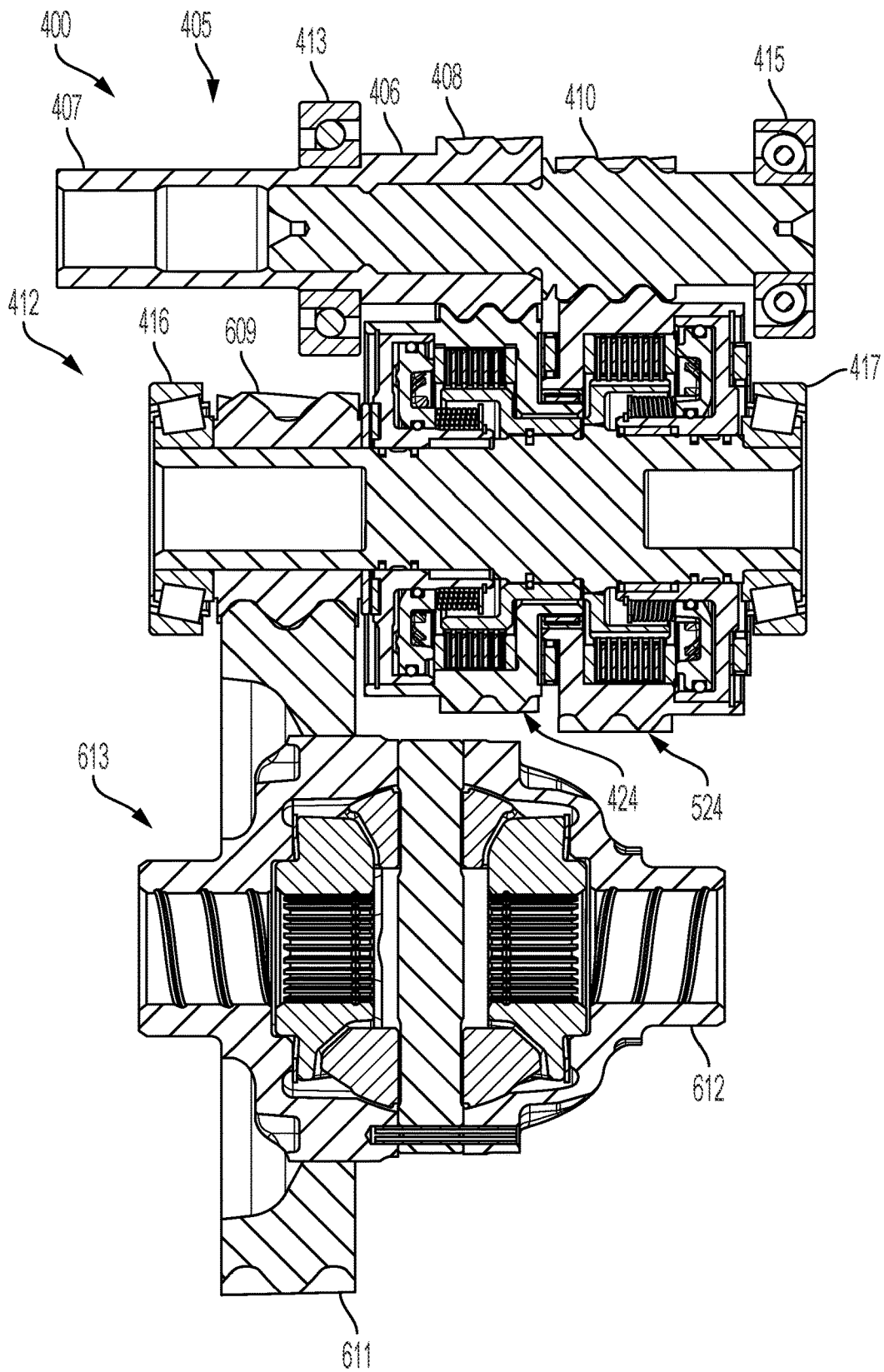
FIG. 17 is a cross-sectional view taken along section line A-A detailed in FIG. 16 of the portion of the electric drive axle shown in FIGS. 11-16.

The first gear-clutch assembly 424 is disposed concentrically about the idler shaft 414. The first gear-clutch assembly 424 is in meshed engagement with the first gear 408 of the output shaft 406 of the electric motor 104 and receives torque therefrom. As illustrated in FIG. 12, the first gear-clutch assembly 424 includes a housing 433 having a first portion 434 and a second portion 435. The first portion 434 shown is formed by a radially outer first annular hub 436 and a radially inner second annular hub 438. The first annular hub 436 extends axially outward and the second annular hub 438 extends axially inward. The second portion 435 shown is formed by a radially outer third annular hub 437 and radially inner fourth annular hub 431. Both the third and fourth annular hubs 437, 431 extend axially inward. In an embodiment shown, a bearing 480 is interposed between the fourth annular hub 431 and the idler shaft 414. The bearing 480 provides rotational and radial support of the first gear-clutch assembly 424. Various types of bearings 480 may be employed as desired. For example, the bearing 480 may be a needle bearing, a roller bearing, or a ball bearing.

A third gear 442 is formed on an outer surface 444 of the first annular hub 436. The third gear 442 is disposed concentrically about the idler shaft 414. The third gear 442 is generally ring-shaped. In an embodiment shown in FIGS. 11-12, the third gear 442 includes a plurality of teeth 446 extending radially outward from the outer surface 444 thereof.

Figure 11:
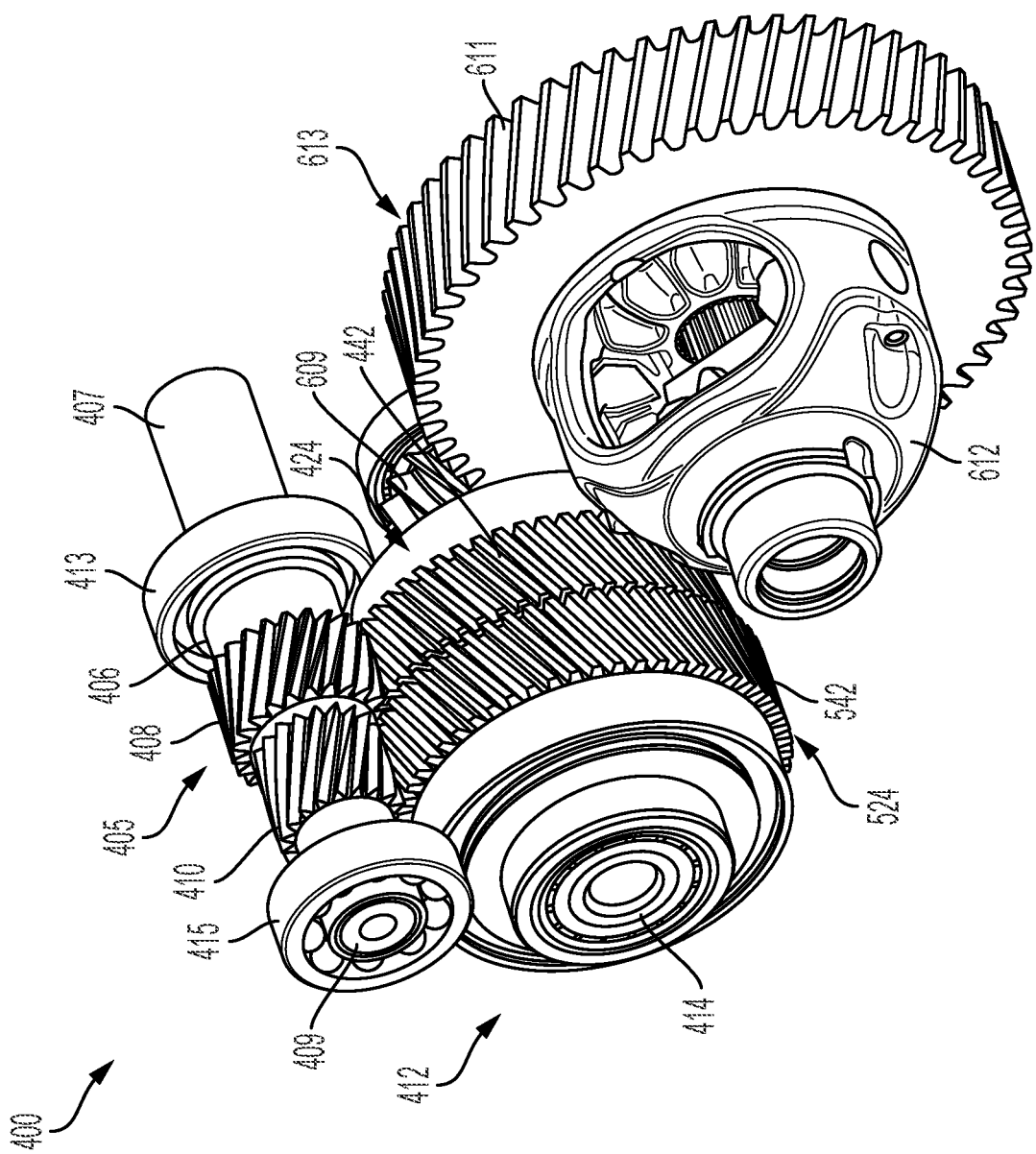
FIG. 11 is side perspective view of a portion of an electric drive axle of the vehicle driveline shown in FIG. 1 according to yet another embodiment of the presently disclosed subject matter, including a motor output assembly, a compound idler assembly, and a differential.

As more clearly shown in FIGS. 11-12, the second annular hub 438 is configured to be disposed concentrically about the idler shaft 414. The intermediate portion 439 of the clutch member 428 is disposed between the second annular hub 438 and an inner surface of the idler shaft 414. As shown, the second annular hub 438 is configured to rotate freely about the intermediate portion 439 of the clutch member 428. At least one bearing (not depicted) may be disposed between the second annular hub 438 and an outer surface of the intermediate portion 439 of the clutch member 428. Various types of bearings may be employed such as a needle bearing, for example.

Referring now to FIG. 12, the first gear-clutch assembly 424 further includes a first clutch 448 therein. The first clutch 448 includes the first portion 440 of the clutch member 428 and at least a portion of the first annular hub 436. A plurality of splines (not depicted) may be formed on the clutch member 428. The splines extend radially outward from an outer surface of the clutch member 428. In certain embodiments, an inner surface of the portion of the first annular hub 436 also includes a plurality of splines (not depicted) formed thereon. The splines extend radially inward from an inner surface of the portion of the first annular hub 436 which forms the first clutch 448.

The first clutch 448 further includes a plurality of first clutch plates 470 interleaved with a plurality of second clutch plates 472. Each of the clutch plates 470, 472 is concentrically disposed about the first portion 440 of the clutch member 428 and within the first annular hub 436. The first clutch plates 470 are in meshed engagement with the first annular hub 436. In certain embodiments, each of the first clutch plates 470 includes a plurality of splines (not depicted) extending radially outward therefrom. The splines of the first clutch plates 470 cooperate with a plurality of splines formed on an inner surface of the first annular hub 436. As such, the first clutch plates 470 receive torque from the first annular hub 436 and the third gear 442. The first clutch plates 470 may move axially relative to the first annular hub 436 and the clutch member 428 within the first gear-clutch assembly 424. The first clutch plates 470 transfer the torque from the first annular hub 436 and the third gear 442 to the second clutch plates 472. It is understood that the first clutch plates 470 can be coupled to the first annular hub 436, while permitting an axial movement thereof, by any suitable method as desired.

In one embodiment, the second clutch plates 472 are in meshed engagement with the first portion 440 of the clutch member 428. In certain embodiments, each of the second clutch plates 472 includes a plurality of splines (not depicted) extending radially inward therefrom. The splines of the second clutch plates 472 cooperate with a plurality of splines formed on an outer surface of the first portion 440 of the clutch member 428. As such, the second clutch plates 472 receive the torque from the first clutch plates 470. The second clutch plates 472 may move axially relative to the first annular hub 436 and the clutch member 428 within the first gear-clutch assembly 424. The second clutch plates 472 transfer the torque from the first clutch plates 470 to the clutch member 428, and thereby the idler shaft 414. It is understood that the second clutch plates 472 can be coupled to the clutch member 428, while permitting an axial movement thereof, by any suitable method as desired.

A first support plate 476 is disposed at a first side of the first clutch 448 adjacent the first portion 434 of the housing 433 of the first gear-clutch assembly 424, and between the first annular hub 436 and the first portion 440 of the clutch member 428. The first support plate 476 is generally ring-shaped and concentrically disposed about the idler shaft 414 of the compound idler assembly 412. The first support plate 476 performs as an abutment for the clutch plates 470, 472 during engagement of the first clutch 448. A positioning element (not depicted) (e.g. a snap ring) may be disposed adjacent the first support plate 476 to maintain a position thereof. In certain embodiments, the positioning element may be received in an annular recess formed in one of the inner surface of the first annular hub 436 and the outer surface of the first portion 440 of the clutch member 428. At least one thrust element (not depicted) may also be disposed adjacent at least one of the first support plate 476 and the positioning element to provide a friction bearing surface.

As more clearly illustrated FIG. 12, a pressure plate 482 may be disposed at an opposite second side of the first clutch 448 between the first annular hub 436 and the first portion 440 of the clutch member 428. The pressure plate 482 is also generally ring-shaped and concentrically disposed about the idler shaft 414 of the compound idler assembly 412. The pressure plate 482 may include a plurality of first splines (not depicted) extending radially outward therefrom. The first splines of the pressure plate 482 cooperate with the splines formed on the inner surface of the first annular hub 436. The pressure plate 482 may also include a plurality of second splines (not depicted) extending radially inward therefrom. The second splines of the pressure plate 482 cooperate with the splines formed on the outer surface of the first portion 440 of the clutch member 428. The pressure plate 482 may move axially relative to the first annular hub 436 and the clutch member 428 within the first gear-clutch assembly 424. The pressure plate 482 is configured to urge the clutch plates 470, 472 in a first axial direction towards the first support plate 476 during engagement of the first clutch 448. It is understood that the pressure plate 482 can be coupled to the first annular hub 436 and the clutch member 428, while permitting an axial movement thereof, by any suitable method as desired.

As illustrated, a piston member 484 is disposed within the second portion 435 of the housing 433 of the first gear-clutch assembly 424. The piston member 484 may also be concentrically disposed about the idler shaft 414 axially adjacent to the pressure plate 482. The piston member 484 includes an axially extending annular portion 486. The axially extending annular portion 486 protrudes towards the pressure plate 482 when assembled. The annular portion 486 of the piston member 484 abuts the pressure plate 482 and is configured to urge the pressure plate 482 in the first axial direction towards the first support plate 476 during engagement of the first clutch 448.

In certain embodiments, the first gear-clutch assembly 424 further includes a second support plate 490. The second support plate 490 is concentrically disposed about the fourth annular hub 431 axially adjacent to the piston member 484. A positioning element 478 (e.g. a snap ring) may be disposed adjacent the second support plate 490 to maintain a position thereof. In certain embodiments, the positioning element 478 is received in an annular recess formed in an outer surface of the fourth annular hub 431. In certain embodiments, the second support plate 490 may include an annular recess (not depicted) formed therein. A biasing element 493 may be interposed between the piston member 484 and the second support plate 490. A first end of the biasing element 493 may be disposed within the annular recess of the second support plate 490. A second end of the biasing element 493 may be received on a positioning member 494 formed on the piston member 484. The biasing member 493 is configured to urge the piston member 484 in an opposite second axial direction during an operation of the first clutch 448. The biasing member 493 may be concentrically disposed about the fourth annular hub 431 and axially between the piston member 484 and the second support plate 490.

In certain embodiments, the second portion 435 of the housing 433 may also include a third fluid passage 496 formed therein. The third fluid passage 496 is in fluid communication with the second fluid source and configured to receive the flow of the second fluid therethrough. As shown, the third fluid passage 496 is formed perpendicular to the longitudinal axis X-X of the idler shaft 414 and in fluid communication with the fluid conduit 432B of the second fluid passage 432. It should be appreciated that any number of third fluid passages 496 may be formed in the second portion 435 of the housing 433 if desired. A pair of sealing members 497A, 497B may be disposed on opposite sides of the third fluid passage 496 to militate against leakage therefrom. In certain embodiments, the sealing members 497A, 497B may be disposed in a pair of grooves 498A, 498B, respectively, formed in the idler shaft 414. It is understood that any number of sealing members 497A, 497B may be employed if desired.

As shown, the third fluid passage 496 extends radially outward from an inner peripheral surface of the second portion 435 of the housing 433 to a chamber 499 formed between the piston member 484 and the second portion 435 of the housing 433. In certain embodiments, an amount of the second fluid in the chamber 499 is varied to selectively position the piston member 484 for engagement and disengagement of the first clutch 448. At least one sealing member (not depicted) is interposed between the piston member 484 and the inner surface of the third annular hub 437 and at least one sealing member (not depicted) is interposed between the piston member 484 and the outer surface of the fourth annular hub 431 to militate against leakage of the second fluid from the chamber 499 during operation of the first gear-clutch assembly 424.

As shown, the first gear-clutch assembly 424 is disposed adjacent the second gear-clutch assembly 524. At least one thrust element or bearing 491 may interposed between the first and second gear-clutch assemblies 424, 524. Various types of thrust elements or bearings 491 may be employed as desired. The thrust element or bearing 491 is configured to militate against frictional contact between the first and second gear-clutch assemblies 424, 524. At least one thrust element or bearing 591 may interposed between the second gear-clutch assembly 524 and the bearing 417. Various types of thrust elements or bearings 591 may be employed as desired. The thrust element or bearing 591 is configured to receive an axial load of the compound idler assembly 412 and provide a friction bearing surface.

Similar to the first gear-clutch assembly 424, the second gear-clutch assembly 524 is disposed concentrically about the idler shaft 414. The second gear-clutch assembly 524 is in meshed engagement with the second gear 410 of the output shaft 406 of the electric motor 104 and receives torque therefrom. As illustrated in FIG. 12, the second gear-clutch assembly 524 includes a housing 533 having a first portion 534 and a second portion 535. The first portion 534 shown is formed by a radially outer first annular hub 536 and a radially inner second annular hub 538. The first annular hub 536 extends axially outward and the second annular hub 538 extends axially inward. The second portion 535 shown is formed by a radially outer third annular hub 537 and radially inner fourth annular hub 531. Both the third and fourth annular hubs 537, 531 extend axially inward. In an embodiment shown, a bearing 580 is interposed between the fourth annular hub 531 and the idler shaft 414. The bearing 580 provides rotational support of the second gear-clutch assembly 524. Various types of bearings 580 may be employed as desired. For example, the bearing 580 may be a needle bearing, a roller bearing, or a ball bearing.

A fourth gear 542 is formed on an outer surface 544 of the first annular hub 536. The fourth gear 542 is disposed concentrically about the idler shaft 414. The fourth gear 542 is generally ring-shaped. In an embodiment shown in FIGS. 11-12, the fourth gear 542 includes a plurality of teeth 546 extending radially outward from the outer surface 544 thereof.

As more clearly shown in FIG. 12, the second annular hub 538 is configured to be disposed concentrically about the idler shaft 414, the intermediate portion 439 of the clutch member 428, and the second annular hub 438 of the first gear-clutch assembly 424. As shown, the second annular hub 538 is configured to rotate freely about the second annular hub 438 of the first gear-clutch assembly 424. At least one bearing 539 may be disposed between the second annular hub 538 and the second annular hub 438 of the first gear-clutch assembly 424. The bearing 539 provides rotational and radial support to the first and second gear-clutch assemblies 424, 524. Various types of bearings may be employed such as a needle bearing, for example.

Referring now to FIG. 12, the second gear-clutch assembly 524 further includes a second clutch 548 therein. The second clutch 548 includes the second portion 441 of the clutch member 428 and at least a portion of the first annular hub 536. A plurality of splines (not depicted) may be formed on the clutch member 428. The splines extend radially outward from an outer surface of the clutch member 428. In certain embodiments, an inner surface of the portion of the first annular hub 536 also includes a plurality of splines (not depicted) formed thereon. The splines extend radially inward from an inner surface of the portion of the first annular hub 536 which forms the second clutch 548.

The second clutch 548 further includes a plurality of first clutch plates 570 interleaved with a plurality of second clutch plates 572. Each of the clutch plates 570, 572 is concentrically disposed about the second portion 441 of the clutch member 428 and within the first annular hub 536. The first clutch plates 570 are in meshed engagement with the first annular hub 536. In certain embodiments, each of the first clutch plates 570 includes a plurality of splines (not depicted) extending radially outward therefrom. The splines of the first clutch plates 570 cooperate with a plurality of splines formed on an inner surface of the first annular hub 536. As such, the first clutch plates 570 receive torque from the first annular hub 536 and the fourth gear 542. The first clutch plates 570 may move axially relative to the first annular hub 536 and the clutch member 428 within the second gear-clutch assembly 524. The first clutch plates 570 transfer the torque from the first annular hub 536 and the fourth gear 542 to the second clutch plates 572. It is understood that the first clutch plates 570 can be coupled to the first annular hub 536, while permitting an axial movement thereof, by any suitable method as desired.

In one embodiment, the second clutch plates 572 are in meshed engagement with the second portion 441 of the clutch member 428. In certain embodiments, each of the second clutch plates 572 includes a plurality of splines (not depicted) extending radially inward therefrom. The splines of the second clutch plates 572 cooperate with a plurality of splines formed on an outer surface of the second portion 441 of the clutch member 428. As such, the second clutch plates 572 receive the torque from the first clutch plates 570. The second clutch plates 572 may move axially relative to the first annular hub 536 and the clutch member 428 within the second gear-clutch assembly 524. The second clutch plates 572 transfer the torque from the first clutch plates 570 to the clutch member 428, and thereby the idler shaft 414. It is understood that the second clutch plates 572 can be coupled to the clutch member 428, while permitting an axial movement thereof, by any suitable method as desired.

A first support plate 576 is disposed at a first side of the second clutch 548 adjacent the first portion 534 of the housing 533 of the second gear-clutch assembly 524, and between the first annular hub 536 and the second portion 441 of the clutch member 428. The first support plate 476 is generally ring-shaped and concentrically disposed about the idler shaft 414 of the compound idler assembly 412. The first support plate 576 performs as an abutment for the clutch plates 570, 572 during engagement of the second clutch 548. A positioning element (not depicted) (e.g. a snap ring) may be disposed adjacent the first support plate 576 to maintain a position thereof. In certain embodiments, the positioning element may be received in an annular recess formed in one of the inner surface of the first annular hub 536 and the outer surface of the second portion 441 of the clutch member 428. At least one thrust element (not depicted) may also be disposed adjacent at least one of the first support plate 576 and the positioning element to provide a friction bearing surface.

As more clearly illustrated FIG. 12, a pressure plate 582 may be disposed at an opposite second side of the second clutch 548 between the first annular hub 536 and the second portion 441 of the clutch member 428. The pressure plate 582 is also generally ring-shaped and concentrically disposed about the idler shaft 414 of the compound idler assembly 412. The pressure plate 582 may include a plurality of first splines (not depicted) extending radially outward therefrom. The first splines of the pressure plate 582 cooperate with the splines formed on the inner surface of the first annular hub 536. The pressure plate 582 may also include a plurality of second splines (not depicted) extending radially inward therefrom. The second splines of the pressure plate 582 cooperate with the splines formed on the outer surface of the second portion 441 of the clutch member 428. The pressure plate 582 may move axially relative to the first annular hub 536 and the clutch member 428 within the second gear-clutch assembly 524. The pressure plate 582 is configured to urge the clutch plates 570, 572 in the second axial direction towards the first support plate 576 during engagement of the second clutch 548. It is understood that the pressure plate 582 can be coupled to the first annular hub 536 and the clutch member 428, while permitting an axial movement thereof, by any suitable method as desired.

As illustrated, a piston member 584 is disposed within the second portion 535 of the housing 533 of the second gear-clutch assembly 524. The piston member 584 may also be concentrically disposed about the idler shaft 414 axially adjacent to the pressure plate 582. The piston member 584 includes an axially extending annular portion 586. The axially extending annular portion 586 protrudes towards the pressure plate 582 when assembled. The annular portion 586 of the piston member 584 abuts the pressure plate 582 and is configured to urge the pressure plate 582 in the second axial direction towards the first support plate 576 during engagement of the second clutch 548.

In certain embodiments, the second gear-clutch assembly 524 further includes a second support plate 590. The second support plate 590 is concentrically disposed about the fourth annular hub 531 axially adjacent to the piston member 584. A positioning element 578 (e.g. a snap ring) may be disposed adjacent the second support plate 590 to maintain a position thereof. In certain embodiments, the positioning element 578 is received in an annular recess formed in an outer surface of the fourth annular hub 531. In certain embodiments, the second support plate 590 may include an annular recess (not depicted) formed therein. A biasing element 593 may be interposed between the piston member 584 and the second support plate 590. A first end of the biasing element 593 may be disposed within the annular recess of the second support plate 590. A second end of the biasing element 593 may be received on a positioning member 594 formed on the piston member 584. The biasing member 593 is configured to urge the piston member 584 in the first axial direction during an operation of the second clutch 548. The biasing member 593 may be concentrically disposed about the fourth annular hub 531 and axially between the piston member 584 and the second support plate 590.

In certain embodiments, the second portion 535 of the housing 533 may also include a fourth fluid passage 596 formed therein. The fourth fluid passage 596 is in fluid communication with the second fluid source and configured to receive the flow of the second fluid therethrough. As shown, the fourth fluid passage 596 is formed perpendicular to the longitudinal axis X-X of the idler shaft 414 and in fluid communication with the fluid conduit 432B of the second fluid passage 432. It should be appreciated that any number of fourth fluid passages 596 may be formed in the second portion 535 of the housing 533 if desired. A pair of sealing members 597A, 597B may be disposed on opposite sides of the fourth fluid passage 596 to militate against leakage therefrom. In certain embodiments, the sealing members 597A, 597B may be disposed in a pair of grooves 598A, 598B, respectively, formed in the idler shaft 414. It is understood that any number of sealing members 597A, 597B may be employed if desired.

As shown, the fourth fluid passage 596 extends radially outward from an inner peripheral surface of the second portion 535 of the housing 533 to a chamber 599 formed between the piston member 584 and the second portion 535 of the housing 533. In certain embodiments, an amount of the second fluid in the chamber 599 is varied to selectively position the piston member 584 for engagement and disengagement of the second clutch 548. At least one sealing member (not depicted) is interposed between the piston member 584 and the inner surface of the third annular hub 537 and at least one sealing member (not depicted) is interposed between the piston member 584 and the outer surface of the fourth annular hub 531 to militate against leakage of the second fluid from the chamber 599 during operation of the second gear-clutch assembly 524.

As illustrated, a fifth gear 609 is disposed concentrically about and coupled with the first segment 418 of the idler shaft 414. In an embodiment, the fifth gear 609 may be forged on the idler shaft 414. In the embodiment shown, the fifth gear 609 is disposed adjacent the first gear-clutch assembly 424 and the bear 416. At least one thrust element or bearing 610 may interposed between the first gear-clutch assembly 424 and the fifth gear 609. Various types of thrust elements or bearings 610 may be employed as desired. The thrust element or bearing 610 is configured to receive the axial load of the compound idler assembly 412 and provide a friction bearing surface.

The fifth gear 609 is in meshed engagement with a sixth gear 611. As illustrated in FIG. 11, the sixth gear 611 is coupled to, and fixed for rotation with, a differential case 612 of a differential 613. The differential case 613 is rotatably supported within a housing (not depicted) such as the axle housing, via a pair of bearings (not depicted). It should be appreciated that any type of bearing can be employed such as a needle bearing, a roller bearing, a tapered bearing, and the like, for example.

It is understood that an operation of the electric drive axles 100, 400 are substantially similar, and therefore, the operation of the electric drive axle 100 is only described hereinafter.

In operation, when a first torque is desired, the fluid actuator assembly is activated. The fluid actuator assembly causes the second fluid to flow from the second fluid source through the third fluid passage 196 into the chamber 199, thereby causing the piston member 184 of the first gear-clutch assembly 124 to be urged in the first axial direction. A movement of the piston member 184 in the first axial direction causes the first clutch 148 to engage, while the second clutch 248 of the second gear-clutch assembly 224 remains disengaged. When the first gear-clutch assembly 124 is engaged, the output shaft 106 of the electric motor 104 causes the first gear 108 coupled thereto, to rotate therewith. A rotation of the first gear 108 drives the third gear 134, and causes the idler shaft 114 and the fifth gear 309 coupled thereto, to rotate therewith. A rotation of the fifth gear 309 drives the sixth gear 311, and causes the differential case 310 to rotate therewith. A rotation of the differential case 310 further causes the first and second half shafts 16, 18 to rotate therewith. The rotation of the differential case 310 transfers the desired first torque from the output shaft 106 to the first and second axle shafts 16, 18. When the electric drive axle 100 is in a power generation mode, the torque transfer described above is reversed.

When operation of the vehicle 10 in the first torque is no longer desired, an operation of the fluid actuator assembly is deactivated. Accordingly, the second fluid flows from the chamber 199 through the third fluid passage 196 and returns to the second fluid source. As the second fluid flows from the chamber 199, the biasing member 206 urges the piston member 184 of the first gear-clutch assembly 124 in the second axial direction. A movement of the piston member 184 in the second axial direction causes the first clutch 148 to disengage. As a result, the torque from the output shaft 106 is not transferred to the third gear 134 of the compound idler assembly 112.

When a second torque is desired, the fluid actuator assembly causes piston member 284 of the second gear-clutch assembly 224 to be urged in the first axial direction. In certain embodiments, the second torque is greater than the first torque. A movement of the piston member 284 in the second axial direction causes the second clutch 248 to engage, while the first clutch 148 of the first gear-clutch assembly 124 remains disengaged. When the second gear-clutch assembly 224 is engaged, the output shaft 106 of the electric motor 104 causes the second gear 110 coupled thereto, to rotate therewith. A rotation of the second gear 110 drives the fourth gear 234, and causes the idler shaft 114 and the fifth gear 309 coupled thereto, to rotate therewith. A rotation of the fifth gear 309 drives the sixth gear 311, and causes the differential case 310 to rotate therewith. A rotation of the differential case 310 further causes the first and second half shafts 16, 18 to rotate therewith. The rotation of the differential case 310 transfers the desired second torque from the output shaft 106 to the first and second axle shafts 16, 18. When the electric drive axle 100 is in a power generation mode, the torque transfer described above is reversed.

When operation of the vehicle 10 in the second torque is no longer desired, an operation of the fluid actuator assembly is deactivated. Accordingly, the third fluid flows from the chamber 299 through the fourth fluid passage 296 and returns to the third fluid source. As the third fluid flows from the chamber 299, the biasing member 306 urges the piston member 284 of the second gear-clutch assembly 224 in the first axial direction. A movement of the piston member 284 in the first axial direction causes the second clutch 248 to disengage. As a result, the torque from the output shaft 106 is not transferred to the fourth gear 234 of the compound idler assembly 112.

Only one of the first and second gear-clutch assemblies 124, 224 is fully engaged at one time during vehicle operation. However, in a parking brake mode, both the first and second gear-clutch assemblies 124, 224 may be engaged simultaneously. The first and second gear-clutch assemblies, 124, 224 also act as support members of the gear train.

It should be appreciated that various types of differentials may be employed for the differentials 312, 613 such as a locking differential and a torque vectoring dual clutch, for example.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

The invention claimed is:

1. A dual-clutch electric drive axle, comprising:
a piston member dividing a chamber in a first portion and a second portion;
a first fluid passage formed in an idler shaft and configured to flow a first fluid from a first fluid source into the first portion and a second fluid passage configured to flow a second fluid from a second fluid source into the second portion; and
a fluid actuator configured to direct the first fluid through the first fluid passage in response to a first desired torque, wherein the fluid actuator is further configured to direct the second fluid through the second fluid passage in response to a second desired torque, wherein the second desired torque is greater than the first desired torque.

2. The dual clutch electric drive axle of claim 1, wherein the piston member moves in a first axial direction and wherein the first fluid in the first portion overcomes a threshold force of a biasing member to engage only a first clutch and not a second clutch, wherein the first clutch is configured to rotate a differential case via rotation of a third gear, a fifth gear, a sixth gear, and the idler shaft of a compound idler assembly when the first desired torque is requested.

3. The dual clutch electric drive axle of claim 2, wherein the second fluid is configured to urge the piston member in a second axial direction, opposite the first axial direction, via a force greater than the threshold force of the biasing member in response to the second desired torque being requested to engage only the second clutch and not the first clutch, wherein the second clutch is configured to rotate the differential case via rotation of a fourth gear, the fifth gear, the sixth gear, and the idler shaft.

4. The dual clutch electric drive axle of claim 3, wherein the first clutch is engaged when the piston member is in a first position, wherein the second clutch is engaged when the piston member is in a second position, and wherein each of the first clutch and the second clutch is disengaged when the piston member is in a third position between the first and second positions.

5. The dual clutch electric drive axle of claim 4, wherein the biasing member is configured to urge the piston member in the second axial direction when the piston member is in the first position, and wherein the biasing member is configured to urge the piston member in the first axial direction when the piston member is in the second position.

6. The dual clutch electric drive axle of claim 3, wherein only one of the first clutch and the second clutch is engaged during a vehicle operation.

7. The dual clutch electric drive axle of claim 3, wherein each of the first clutch and the second clutch are engaged during a parking brake mode.

* * * * *